United States Patent
Yamane et al.

(10) Patent No.: US 9,774,216 B2
(45) Date of Patent: Sep. 26, 2017

(54) SYSTEM AND METHOD FOR CONTROLLING POWER SYSTEM

(75) Inventors: Kenichiro Yamane, Tokyo (JP); Kunihiko Tsunedomi, Tokyo (JP); Noriyuki Uchiyama, Tokyo (JP); Yasushi Tomita, Tokyo (JP); Tsukasa Onishi, Tokyo (JP); Masatoshi Kumagai, Tokyo (JP)

(73) Assignee: Hitachi, Ltd., Tokyo (JP)

(\*) Notice: Subject to any disclaimer, the term of this patent is extended or adjusted under 35 U.S.C. 154(b) by 329 days.

(21) Appl. No.: 14/402,366

(22) PCT Filed: Jul. 10, 2012

(86) PCT No.: PCT/JP2012/067615
§ 371 (c)(1),
(2), (4) Date: Nov. 20, 2014

(87) PCT Pub. No.: WO2014/010030
PCT Pub. Date: Jan. 16, 2014

(65) Prior Publication Data
US 2015/0142187 A1    May 21, 2015

(51) Int. Cl.
*H02J 13/00* (2006.01)
*G06Q 10/04* (2012.01)
(Continued)

(52) U.S. Cl.
CPC ......... *H02J 13/0013* (2013.01); *G05B 13/04* (2013.01); *G05B 15/02* (2013.01);
(Continued)

(58) Field of Classification Search
CPC .. H02J 13/0013; H02J 13/002; H02J 13/0079; H02J 13/0082; H02J 2003/007;
(Continued)

(56) References Cited

U.S. PATENT DOCUMENTS 4,689,752 A \* 8/1987 Fernandes ............... G01K 1/024
340/538
8,108,184 B2 \* 1/2012 Fardanesh ............ G06F 17/504
703/18
(Continued)

FOREIGN PATENT DOCUMENTS

CN 101383511 A \* 3/2009 ............ H02J 3/00
EP 2 224 568 A2 9/2010
(Continued)

OTHER PUBLICATIONS

Extended European Search Report received in corresponding European Application No. 12880898.7 dated Mar. 2, 2016.

*Primary Examiner* — Crystal J Barnes-Bullock
(74) *Attorney, Agent, or Firm* — Mattingly & Malur, PC

(57) ABSTRACT

To control a power state of a power system properly according to a communication state. A system for controlling a power system includes a plurality of sensor devices configured to output measurement data; a first control apparatus configured to estimate a first power state of the power system by using the measurement data obtained by the plurality of sensor devices, calculate a first controlled variable according to the estimated first power state, and output the calculated first controlled variable; and at least a second control apparatus configured to execute a predetermined control operation according to either the first controlled variable calculated in the first control apparatus, or a second controlled apparatus calculated in the second control apparatus. When it is not able to obtain part of the measurement data, the first control apparatus estimates the first power state by using predetermined measurement data among the obtained measurement data.

8 Claims, 16 Drawing Sheets

(51) Int. Cl.
  *H02J 4/00* (2006.01)
  *G06Q 50/06* (2012.01)
  *G05B 15/02* (2006.01)
  *H02J 3/12* (2006.01)
  *H02J 3/18* (2006.01)
  *G05B 13/04* (2006.01)
  *G05F 1/66* (2006.01)

(52) U.S. Cl.
  CPC .............. *G05F 1/66* (2013.01); *G06Q 10/04* (2013.01); *G06Q 50/06* (2013.01); *H02J 3/12* (2013.01); *H02J 3/18* (2013.01); *H02J 4/00* (2013.01); *H02J 13/002* (2013.01); *Y02E 40/30* (2013.01); *Y02E 40/74* (2013.01); *Y02E 60/74* (2013.01); *Y02E 60/7807* (2013.01); *Y04S 10/22* (2013.01); *Y04S 10/30* (2013.01); *Y04S 40/12* (2013.01)

(58) Field of Classification Search
  CPC .. H02J 3/06; Y04S 10/30; Y04S 10/54; Y04S 40/121; Y04S 10/26; Y02E 10/563; Y02E 10/763; Y02E 40/72; Y02E 60/74; Y02E 60/7815; Y02E 60/727; Y02E 60/7807; G06Q 10/04; G06Q 10/06; G06Q 30/0202; G06Q 50/06; G05B 15/02; G05B 23/0221; G06F 2217/78
  See application file for complete search history.

(56) References Cited

U.S. PATENT DOCUMENTS

| | | | | |
|---|---|---|---|---|
| 8,190,379 | B2* | 5/2012 | Rehtanz | H02J 3/24 702/57 |
| 8,560,263 | B2* | 10/2013 | Yamamoto | H02J 13/002 324/66 |
| 8,600,572 | B2* | 12/2013 | Sri-Jayantha | G06Q 10/04 700/291 |
| 9,413,173 | B2* | 8/2016 | Kuroda | H02J 3/386 |
| 9,462,557 | B2* | 10/2016 | Anto | H04W 52/08 |
| 2008/0177678 | A1* | 7/2008 | Di Martini | G01D 4/002 705/412 |
| 2009/0040029 | A1* | 2/2009 | Bridges | G06Q 50/06 340/12.37 |
| 2012/0022713 | A1* | 1/2012 | Deaver, Sr. | G05B 17/02 700/298 |
| 2012/0310559 | A1* | 12/2012 | Taft | H02J 13/0013 702/62 |
| 2013/0304266 | A1* | 11/2013 | Giannakis | G01R 21/133 700/286 |
| 2015/0214741 | A1* | 7/2015 | Kuroda | H02J 3/24 700/298 |
| 2015/0241896 | A1* | 8/2015 | Nishibayashi | G05B 15/02 700/286 |
| 2015/0261239 | A1* | 9/2015 | Zhang | G06Q 30/08 700/291 |

FOREIGN PATENT DOCUMENTS

| | | | |
|---|---|---|---|
| EP | 2 763 261 A1 | 8/2014 | |
| JP | 06-269123 A | 9/1994 | |
| JP | 09-074679 A | 3/1997 | |
| JP | 2001-103669 A | 4/2001 | |
| JP | 2006-87177 A | 3/2006 | |
| JP | 2007-288877 A | 11/2007 | |
| JP | 2008-118799 A | 5/2008 | |
| JP | 2008-154418 A | 7/2008 | |
| JP | 2009-65788 A | 3/2009 | |
| JP | 2011-217581 A | 10/2011 | |
| JP | 2013074639 A * | 4/2013 | |
| JP | 5615785 B2 * | 10/2014 | H02J 13/0006 |

* cited by examiner

FIG. 3

| | | | NODE MANAGEMENT INFORMATION T10 | | | |
|---|---|---|---|---|---|---|
| C100 | C101 | C102 | C103 | C104 | C105 | C106 |
| NODE ID | SUBSTATION | POLE-MOUNT TRANSFORMER | SENSOR ID | CONTROL DEVICE ID | SENSOR MEASUREMENT VALUE | STATE ESTIMATE VALUE |
| 31a | 1 | 0 | 3a | 2a | Pa, Qa, (Va) | |
| 31b | 0 | 1 | 3b | 0 | Pb, Qb, (Vb) | |
| 31c | 0 | 1 | 0 | 0 | | Pc, Qc, (Vc) |
| 31d | 0 | 1 | 3c | 2b | Pc, Qc, (Vc) | |
| 31e | 0 | 1 | 0 | 0 | | Pe, Qe, (Ve) |
| 31f | 0 | 1 | 3d | 0 | Pd, Qd, (Vd) | |
| 31g | 0 | 0 | 3e | 2c | Pe, Qe, (Ve) | |

FIG. 4

| | | BRANCH MANAGEMENT INFORMATION T11 | | |
|---|---|---|---|---|
| C110 | C111 | C112 | C113 | C114 |
| BRANCH ID | START POINT NODE | END POINT NODE | R [Ω] | X [Ω] |
| 32a | 31a | 31b | 0.05 | 0.07 |
| 32b | 31b | 31c | 0.04 | 0.06 |
| 32c | 31c | 31d | 0.06 | 0.08 |
| 32d | 31d | 31e | 0.05 | 0.07 |

FIG. 5

| | | CONTROL DEVICE MANAGEMENT INFORMATION T12 | | |
|---|---|---|---|---|
| C120 | C121 | C122 | C123 | C124 |
| CONTROL DEVICE ID | REFERENCE VOLTAGE | LDC PARAMETER | OPERATION TIME PERIOD | RATED CAPACITY |
| 2a | | | | |
| 2b | | | | |
| 2c | | | | |

FIG. 6

| SENSOR DATA T13 | | | | |
|---|---|---|---|---|
| C130 | C131 | C132 | C133 | C134 |
| TIME STAMP | SENSOR ID | P | Q | V |
| t1 | 3a | | | |
| t1 | 3b | | | |
| t1 | 3c | | | |
| t1 | 3d | | | |
| t1 | 3e | | | |
| t2 | 3a | | | |
| t2 | 3b | | | |
| t2 | 3c | | | |
| t2 | 3d | | | |
| t2 | 3e | | | |
| ... | ... | ... | ... | ... |

SYSTEM AND METHOD FOR CONTROLLING POWER SYSTEM

TECHNICAL FIELD

The present invention relates to a system and a method for controlling a power system.

BACKGROUND ART

There has been a technique to control the voltage at a self-terminal position (position where a power system control device is installed) to reach a target voltage using a power system control device, such as a step voltage regulator (SVR) or a static var compensator (SVC).

In addition, a technique which is so-called centralized control technique has been known (PTL 1), in which the overall state of a power system is grasped in a batch by a monitor control server to supply the optimal control instruction to each control device. Another technique for SVR to monitor reactive power is also known (PTL 2), in which when the reactive power is continuously measured for or longer than a predetermined time, it can be estimated that the SVC is in operation, and a tap switching control of the SVR is performed. This technique is so-called autonomous distributed control technique that does not require any communication.

CITATION LIST

Patent Literature

PTL 1: JP 2007-288877 A
PTL 2: JP 2011-217581 A

SUMMARY OF INVENTION

Technical Problem

Recently, a house that is so-called all-electric house where cooking utensils, a water heater, air conditioners, and lighting devices are powered by electricity alone has been spreading. In addition, an electric water heater, which heats water using inexpensive nighttime electricity, and electric vehicles have also been spreading. The power demand has been thus diversifying.

Meanwhile, auxiliary power generation, including solar power generation, fuel cells, storage batteries for domestic use, etc., has also been implemented at various locations. Accordingly, the variation of the state (voltage) of the power system and particularly a distributed system is increased, which causes a future difficulty in maintaining the variation within a proper range as defined in Electricity Business Act.

Conventionally, the voltage variation has been restricted to fall within a proper range by the SVR and the SVC. However, the SVR and the SVC basically operate independently and do not work with nearby control devices. Therefore, if a large capacity load is provided in the power system or many distributed power units are connected to the power system, it may cause difficulty in restricting the voltage variation of the power system to be within a proper range.

The technique of PTL 1 is effective in a case where a stable communication environment is provided between the monitor control server and the control devices, and high speed and high quality communications are allowed. In many cases, however, such a high speed and high quality communication environment may not be available, for example, in a remote place in the mountainous areas. Without using the high speed and high quality communication environment, there is a risk that the transmission of a control command from the monitor control server to the control devices may be delayed, or otherwise the control command does not arrive. Accordingly, it may not be possible to perform control operations sufficiently and properly.

The technique of PTL 2 is considered effective only when the SVR and the SVC are arranged close to each other. In other arrangements of the control devices, or when the SVC and the SVR are not arranged close enough to allow the SVR side to detect reactive power output from the SVC, the proper control operations would be difficult.

The present invention has been achieved in view of the above problems, and an object of the present invention is to provide a system and a method for controlling a power system that allow proper control of the power system by estimating a power state of the power system even when a satisfying communication quality is not provided between a first control apparatus and a second control apparatus. The first control apparatus calculates a controlled variable, and the second control apparatus executes a predetermined control operation according to the calculated controlled variable. Another object of the present invention is to provide a system and a method for controlling a power system that allow execution of a proper control mode by selecting it among a plurality of previously prepared control modes according to the communication state between the first control apparatus and the second control apparatus.

Solution to Problem

To solve the above problems, a system of a power system according to the present invention is configured as a system for controlling a power system to control a power state of the power system, including a plurality of sensor devices arranged in the power system and configured to output measurement data, a first control apparatus configured to estimate a first power state of the power system by using the measurement data obtained from the plurality of sensor devices, calculate a first controlled variable according to the estimated first power state, and output the calculated first controlled variable, and at least a second control apparatus arranged in the power system in a communicable manner with the first control apparatus and configured to execute a predetermined control operation according to either the first controlled variable calculated in the first control apparatus or a second controlled variable calculated in the second control apparatus. When it is unable to obtain part of the measurement data, the first control apparatus estimates the first power state by using measurement data among the obtained measurement data.

The first control apparatus can previously create a first power state estimating model for each combination of the predetermined measurement data to estimate a first power state according to the predetermined measurement data, estimate the first power state by using the predetermined measurement data and the first power state estimating model that matches the combination of the predetermined measurement data that has been actually obtained among the plurality of first power state estimating models, calculate the first controlled variable according to the estimated first power state, and transmit the calculated first controlled variable to the second control apparatus.

The first control apparatus can create a first controlled variable calculating model to calculate the first controlled variable corresponding to the estimated first power state, calculate the first controlled variable according to the estimated first power state and the first controlled variable calculating model, and transmit the calculated first controlled variable to the second control apparatus.

The second control apparatus can execute a first control mode in a predetermined first case, and executes, in the first control mode, a predetermined control operation according to the first controlled variable received from the first control apparatus. The predetermined first case is, for example, case where a proper communication state exists between the first control apparatus and the second control apparatus. The proper communication state is, for example, a state where the communication state between the first control apparatus and the second control apparatus is not decreased to at or below a predetermined fixed value.

The first control apparatus can transmit, to the second control apparatus, a second power state estimating model created from the first power state estimating model and a second controlled variable calculating model created from the first controlled variable calculating model. The second control apparatus can store the second power state estimating model and the second controlled variable calculating model received from the first control apparatus. The second control apparatus can execute a second control mode in a predetermined second case. In the second control mode, the second control apparatus can estimate a second power state of the power system according to the measurement data of a predetermined sensor device among the sensor devices and the second power state estimating model, calculate a second controlled variable according to the estimated second power state and the second controlled variable calculating model, and execute a predetermined control operation, according to the calculated second controlled variable.

Advantageous Effects of Invention

According to an embodiment of the present invention, the first control apparatus can estimate the first power state by using the obtained predetermined measurement data even when part of the measurement data cannot be used. According to the first power state, the first controlled variable can be calculated.

BRIEF DESCRIPTION OF DRAWINGS

FIG. 3 illustrates the structure of node management information.

FIG. 4 illustrates the structure of branch management information.

FIG. 5 illustrates the structure of control device management information.

FIG. 6 illustrates the structure of measurement data.

DESCRIPTION OF EMBODIMENTS

Figure 1:
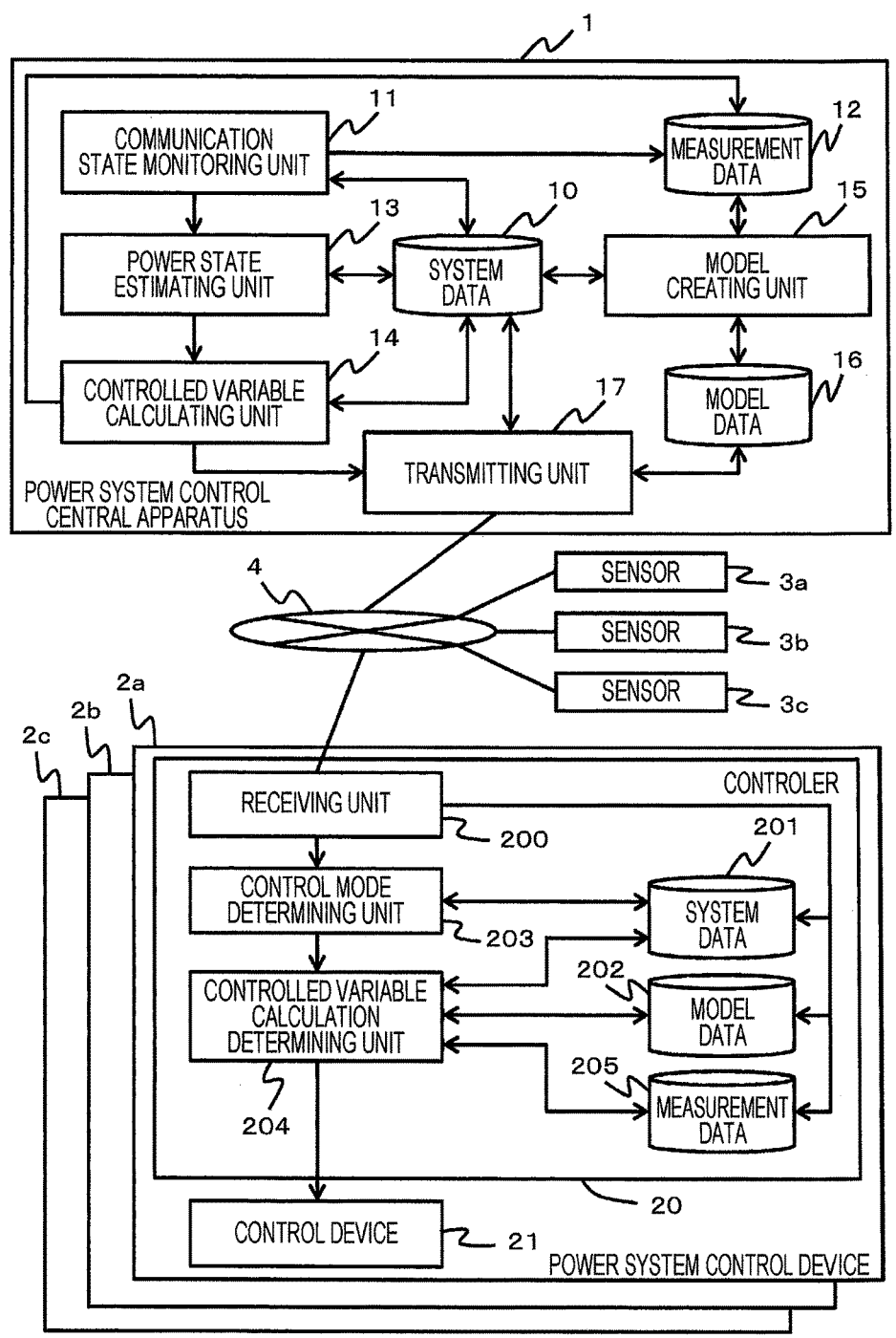
FIG. 1 illustrates an overall structure of a system for controlling the power system.

Embodiments of the present invention will be described below by referring to the accompanying drawings. In the present embodiment, as described in detail below, a power system control central apparatus 1 acts as a "first control apparatus" and estimates the power state of a power system according to measurement data that has been actually obtained from a plurality of sensors 3 which act as "sensor devices" arranged in the power system. The power state may be estimated according to all measurement data. Alternatively, the power state may be estimated according to only a part of the measurement data of the measurement data.

The power system control central apparatus 1 receives the measurement data transmitted from the sensors 3, each sensor measuring the power state at a particular location in the power system, and stores the measurement data in a storage means 12. The power system control central apparatus 1 uses the measurement data to perform estimation calculation of the power state of the entire power system according to either power flow calculation method or state estimation method. The power system control central apparatus 1 stores the estimated power state in the storage means 12, and uses the estimated power state to calculate a controlled variable to be output from each power system control device 2 that acts as a "second control apparatus". The power system control central apparatus 1 stores the calculated controlled variable in the storage means 12, and uses the measurement data, the power state, and the controlled variable, each stored in the storage means 12, to determine a parameter regarding the power state estimating model and a parameter regarding the control calculation model for use in the power system control device 2. The determined parameters are transmitted and stored in the power system control device 2.

Specifically, the power system control central apparatus 1 creates, for each power system control device 2, the power state estimating model used by the power system control devices 2 to estimate the power state, and transmits them to the power system control devices 2. Further, the power system control central apparatus 1 creates, for each power system control device 2, the controlled variable calculating model to calculate the controlled variable according to the estimated power state, and transmits them to the power system control devices 2.

A communication state between each power system control device 2 and the power system control central apparatus 1 can be determined from a communication state between the power system control central apparatus 1 and individual sensors 3 which use the same communication network.

When the communication state between each power system control device 2 and the power system control central apparatus 1 is normal, a centralized control mode is executed as a "first control mode". In the centralized control mode, the power system control central apparatus 1 estimates the power state at predetermined locations of the power system according to the measurement data that has been actually obtained. The power system control central apparatus 1 calculates a controlled variable from the estimated power state, and transmits a control command including the calculated controlled variable to each power system control device 2. In the centralized control mode, the power system control device 2 executes a predetermined control operation according to the controlled variable included in the control command received from the power system control central apparatus 1. The predetermined control operation is varied depending on the type of the power system control devices 2.

When the communication state with the power system control central apparatus 1 is deteriorated, each power system control device 2 transfers from the centralized control mode to a distributed control mode provided as a "second control mode". In the distributed control mode, the power system control device 2 estimates the power state to be controlled by the power system control device 2 by entering the measurement data of the predetermined sensor of the sensors 3 to the power estimating model received from the power system control central apparatus 1. Further, in the distributed control mode, the power system control device 2 determines the controlled variable by entering the power state estimated by the power system control device 2 into the controlled variable calculating model received from the power system control central apparatus 1, and executes the predetermined control operation to realize the controlled variable.

When time passes in a state where the communication state between the power system control devices 2 and the power system control central apparatus 1 is deteriorated until a valid period, which has been preset in the power state estimating model, is passed, the control mode is shifted from the distributed control mode to a third control mode referred to as an "autonomous control mode". In the autonomous control mode, the power system control device 2 calculates the controlled variable according to the measurement data of a predetermined sensor, that is, for example, a sensor (self-terminal sensor) that is directly associated with the own device among the sensors 3, and also according to the system data that has been previously stored and represents the structure of the power system. The power system control device 2 executes the predetermined control operation according to the calculated controlled variable.

As described above, the power system control central apparatus 1 can estimate the power state, according to the measurement data that has been actually obtained among the measurement data from the plurality of sensors 3. Therefore, even when the communication state between the sensors 3 and the power system control central apparatus 1 is bad, it is possible to estimate the power state corresponding to the communication state (communication speed, communication quality), and enhance reliability of communication.

The power system control system according to the present embodiment is capable of selecting a proper control mode from the previously prepared plurality of control modes (centralized control mode, distributed control mode, autonomous control mode) according to the communication state between the power system control central apparatus 1 and the power system control devices 2, and controlling the state of the power system according to the selected control mode. Accordingly, it is possible to properly control the power state corresponding to the communication state (communication speed, communication quality) and enhance reliability of communication.

First Embodiment

The system for controlling the power system according to a first embodiment will be described below by referring to FIGS. 1 to 13. In the present embodiment, an example of a system for controlling the power system will be described. The system monitors the communication state of a communication network 4 for controlling the power system, switches the control mode according to the communication state, and properly controls the power system control devices 2.

The system for controlling the power system illustrated in FIG. 1 includes the power system control central apparatus 1, a plurality of power system control devices 2a to 2c, and a plurality of sensors 3a to 3c, which are communicably connected with each other via a communication network 4. The power system control devices 2a to 2c will hereinafter be referred to as power system control devices 2, and the sensors 3a to 3c will be referred to as sensors 3, unless otherwise specified.

The power system control central apparatus 1 may be configured, for example, as a computer system that includes a central processing unit, a storage device, a communication device (which are not shown) and the like. The storage device stores a computer program and data. The central processing unit (CPU) reads and executes the computer program to implement functions described below.

The power system control central apparatus 1 has a data storing function for data storage. The data storing function includes a system data storage unit 10 for storing system data, a measurement data storage unit 12 for storing measurement data, and a model data 16 for storing model data. The power system control central apparatus 1 further includes a communication state monitoring unit 11 that monitors a communication state, a power state estimating unit 13 that estimates a power state, a controlled variable calculating unit 14 that calculates the controlled variable, a model creating unit 15 that creates models, and a transmitting unit 17 for communicating with each of the power system control devices 2 and the sensors 3.

For convenience of explanation, the data stored in the system data storage unit 10 may be referred to as system data 10, the data stored in the measurement data storage unit 12 may be referred to as measurement data 12, and the data stored in the model data storage unit 16 may be referred to as model data 16, respectively.

The structure of the power system control devices 2 will be described. Each power system control device 2 includes a controller 20 and a control unit 21. The controller 20 has a data storing function for data storage. The data storing function includes a system data storage unit 201 that stores the system data, a model data storage unit 202 that stores the model data, and a measurement data storage unit 205 that stores the measurement data. The controller 20 further includes a receiving unit 200 for communicating with the power system control central apparatus 1 and the sensors 3, a control mode determining unit 203 that determines a mode among a plurality of control modes, and a controlled variable calculation determining unit 204 that calculates a controlled variable corresponding to the control mode.

For convenience of explanation, the data stored in the system data storage unit 201 may be referred to as system data 201, the model data stored in the model data storage unit 202 may be referred to as model data 202, and the data stored in the measurement data storage unit 205 may be referred to as measurement data 205, respectively.

The sensors 3 will be described. The sensors 3 are devices that measure a power state quantity at positions where the sensors 3 are installed. The power state quantity measured by the sensors 3 is transmitted via the communication network 4 to the communication state monitoring unit 11 of the power system control central apparatus 1 and the receiving unit 200 of the power system control devices 2. Hereinafter, the data of the power state quantity measured by the sensors 3 will be referred to as sensor data.

The communication state monitoring unit 11 of the power system control central apparatus 1 stores the received sensor data as part of the measurement data 12. Similarly, the receiving unit 200 of the power system control device 2 stores the received sensor data as part of the measurement data 205. Storage of the sensor data will be described later by referring to FIG. 6.

The communication network 4 will be described. The communication network 4 is a communication line network that connects the power system control central apparatus 1, the power system control devices 2, and the sensors 3. The apparatus and the devices 1, 2, and 3 transmit and receive various information including the control instructions, sensor data, etc. via the communication network 4. For example, a communication medium may be realized by a wired network including a public network such as a telephone network, a local network such as Ethernet (registered trademark), a dedicated communication network, or a power line carrier communication network. Alternatively, the communication medium may be realized by a wireless network including a cellular phone communication network, a PHS, business-use radio network, a satellite network, a wireless LAN, ZigBee (registered trademark), etc.

Functions of the constituent elements of the power system control central apparatus 1 will be described. The system data 10 is the data regarding the configuration of the power system network. The system data 10 will be described by referring to examples illustrated in FIGS. 2 to 5.

Figure 2:
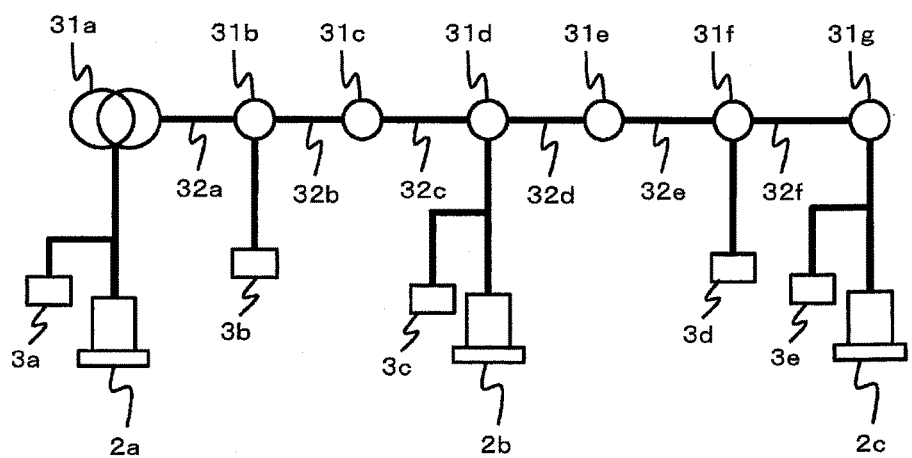
FIG. 2 is a schematic diagram illustrating the structure of a power system network.

FIG. 2 is a schematic diagram illustrating a power system network. The power system network is roughly divided into node 31 and branch 32, each having attribute data. Nodes 31a to 31g will be referred to as nodes 31, and the branches 32a to 32f will be referred to as branches 32, unless otherwise specified.

For example, the node 31a may be a substation to which the sensor 3a and the power system control device 2a are connected. The node 31b is a pole on which pole-mount transformer is installed and the sensor 3b is connected. The node 31c is a pole on which a pole-mount transformer is installed, but no sensor is provided. The node 31d represents a load or a power supply of a consumer or a distributed power supply, where the sensor 3c and the power system control device 2b are connected. The node 31e is a pole on which a pole-mounted transformer is installed, but no sensor is provided. The node 31f is a pole on which the pole-mounted transformer is installed and the sensor 3d is installed. The last node 31g represents a load or a power supply of a consumer or a distributed power supply, where the sensor 3e and the power system control device 2c are connected.

Next, a node management information T10 for managing the structure of the node 31 will be described by referring to FIG. 3. The node management information T10 forms part of the system data 10.

The node management information T10 is configured to manage information by correlating various information including, for example, node identifying information C100, information indicating the presence of the substation (substation flag) C101, information indicating the presence of the pole-mounted transformer (pole-mounted transformer flag) C102, sensor identifying information C103, control devices identifying information C104, a sensor measurement value (sensor data value) C105, and a state estimate value C106. Other items may be added to the illustrated items, or the illustrated management information may be divided into a plurality of management information pieces and the divided pieces of information may be correlated with each other by a link, a pointer, etc. The same thing applies to the management information described below other than the node management information T10.

Each sensor 3 can measure effective power P, reactive power Q, voltage V, and the like, depending on the type or role of the sensor, and output the sensor data. The state estimate value C106 is a value estimated by using all or part of the sensor data from each sensor 3. At the nodes 31c, 31e where no sensor 3 is installed, the power state of such nodes is estimated and stored in the node management information T10.

The branches 32 will be described. The branches 32 are paths between the nodes and are specifically realized as transmission lines or distribution lines. Each branch 32 has resistance R and reactance X as impedance.

The branch 32a is a section between a start node 31a and an end node 31b. The branch 32b spans between the start node 31b and the end node 31c. The branch 32c spans between the start node 31c and the end node 31d. The branch 32d spans between the start node 31d and the end node 31e. The branch 32e spans between the start node 31e and the end node 31f. The branch 32f spans between the start node 31f and the end node 31g.

Branch management information T11 configured to manage the structure of the branches 32 will be described by referring to FIG. 4. The branch management information T11 forms part of the system data 10. The branch management information T11 performs management of, for example, information C110 identifying the branch 32, information indicating a start node C111, information indicating an end node C112, a resistance value C113, and reactance C114, which are correlated with each other.

Control device management information T12 for managing the power system control devices 2 will be described by referring to FIG. 5. The control device management information T12 forms a part of the system data 10. The control device management information T12 is configured to manage information by correlating various information including, for example, information C120 to identify the power system control device 2, reference voltage C121, a line drop compensator (LDC) parameter C122, an operation time period C123, a rated capacitance C124, and the like.

The communication state monitoring unit 11 will be described. The communication state monitoring unit 11 collects sensor data with time stamp from each sensor 3 at a predetermined constant monitoring cycle Tm, and stores the collected sensor data with a time stamp in a memory or the like as the measurement data 12.

Sensor data T13 having been collected and stored periodically will be described by referring to FIG. 6. The sensor data T13 is stored as part of the measurement data 12 by correlating the time stamp C130 with information C131 to identify the sensor 3, a measurement value C132 (effective power), C133 (reactive power), and C134 (voltage). In addition, an electric current, a power factor, and a flow direction (direction of electric current) may also be included in the measurement values of the power state.

According to the collected sensor data with time stamp, the communication state monitoring unit 11 determines, for each sensor 3, the health of the communication state with the power system control central apparatus 1. An exemplary method for determining the health of the communication state will be described.

For example, when the sensor data from the sensors 3 is to be collected at a predetermined cycle Ta ($\leq$Tm), a difference between the current time and the time stamp of the last sensor data obtained (the latest sensor data of the received sensor data) is determined. The obtained difference is then compared with the predetermined cycle Ta. If the difference between the current time and the time stamp of the latest sensor data exceeds the predetermined cycle Ta (current time–time stamp of the latest sensor data>Ta), can be determined that the health of the communication state is decreased. As the difference between the current time and the time stamp of the latest sensor data increases, it can be determined that the health of the communication state is further decreased.

The decrease of the health of the communication state is caused by the communication network 4 itself and the sensors 3 themselves. The cause arising from the communication network 4 itself may be, for example, congestion of communication, radio wave interruption due to obstacles or electromagnetic waves of electric devices, disconnections, etc. The cause arising from the sensors 3 themselves may be, for example, suspension of processing due to the failure or excessive load of the sensors 3. Accordingly, it is possible to determine things including whether the sensors 3 are normally operating by determining the health of the communication state of the sensors 3 and the power system control central apparatus 1.

As described above, the sensor data includes the measured power state quantity (effective power, reactive power, voltage, etc.). The sensor data is periodically transmitted to the communication state monitoring unit 11 from the sensors 3 via the communication network 4, and stored by attaching the time stamp to the sensor data.

The transmission cycle of the sensor data is predetermined by considering, for example, the spec of the communication network, the number of communication devices, target performance, etc. for each power system. The transmission cycle may be set, for example, to 1 minute, 3 minutes, 10 minutes, 30 minutes, 60 minutes, etc. These numerical values are merely examples, and the embodiment of the present invention is not limited to these values. The same thing applies to other numerical values.

The measurement data 12 will be described. In addition to the sensor data, the measurement data 12 includes an estimate value of the power state estimated by the power state estimating unit 13 and a time stamp thereof, and a time stamp working as a controlled variable and control timing of each power system control device 2 calculated by the controlled variable calculating unit 14.

The power state estimating unit 13 will be described. The power state estimating unit 13 determines observability in power state estimation calculations according to the number of items of the sensor data whose communication state has been determined to be normal (hereinafter referred to as normal sensor data number) by the communication state monitoring unit 11.

An exemplary method for determining observability will be described. For example, a total number of the power state of the node 31 and the branch 32 in a target power system is represented by Nd, and a ratio of the normal sensor data number Nn relative to the total number Nd (Nn/Nd) is calculated. If the ratio (Nn/Nd) is at or more than a predetermined value, the observability is determined. Otherwise, observability is not determined.

Next, the power state estimation calculation of the entire power system (voltage, effective power, reactive power, etc.) is performed using the sensor data, which has been determined to be normal, and the system data 10 by different methods depending on the observability. If the observability is determined, the state estimation calculation including a power flow calculation is performed, otherwise only the power flow calculation is performed. In the power flow calculation, equations (power equations) are established for the effective power and the reactive power regarding individual nodes and branches. The equations are solved with the sensor data to determine the power state of the individual nodes and branches.

In the state estimation calculation, an initial value of the power state is given for each node, and an estimate value regarding the power state is obtained by the power flow calculation according to the initial value. Then a solution regarding the power state of each node is repeatedly calculated so as to minimize the sum of the square deviations between the estimate value and the measurement value regarding the power state. Finally, the estimate value of the power state at an optional point of the power system is obtained. A time stamp is added to the estimated power state value obtained above and stored as the measurement data 12. The method for estimating the power state will be described again in connection with other embodiments. The power state estimated by the power state estimating unit 13 of the power system control central apparatus 1 corresponds to a "first power state".

The controlled variable calculating unit 14 uses the power state estimated by the power state estimating unit 13 to calculate the controlled variable to be output by each power system control device 2 as a "first controlled variable". In this calculation, for example, a sum of the square, deviations between the measurement voltage and a target voltage at particular points may be used as an objective function. The optimal controlled variable of each control device is then calculated so as to minimize the objective function.

As solving methods to minimize the objective function, a hill-climbing method, quadratic programming, a taboo search, etc. are provided. A suitable method corresponding to the characteristic of the objective function, the characteristic of the controlled variable (consecutive values, discrete values), etc. may be used. A time stamp is added to each controlled variable obtained above as a calculation result, and the obtained result is stored as the measurement data 12. The calculated controlled variable is transmitted to a predetermined power system control device 2 via the transmitting unit 17.

A model creating unit 15 will be described. The model creating unit 15 creates model data (parameters of calculation expressions) used by each power system control device 2 to estimate the power state or calculate the controlled variable corresponding to the estimated power state.

The model creating unit 15 uses various items of data stored in the measurement data 12 as teacher data, and identifies parameters of, a calculation model to be used in the controller 20 of the power system control device 2.

The calculation model to be created is a power state estimating model and a controlled variable calculating model. Each model may be either a linear model or a non-linear model. In this case, a linear model will be described as an example.

The power state measured by each sensor 3, is input to the power state estimating model. Output of the power state estimating model is the power state regarding each node (or branch) of the power system estimated by the power state estimating unit 13.

As a linear model represented by an expression 1 below, each coefficient parameter is identified by the least square method using input and output data regarding a plurality of time stamps. In this case, effective power (real number component) and reactive power (imaginary number component) at an optional node n are represented by Sn. Effective power (real number component) and reactive power (imaginary number component) measured by the sensor (sensor node k) are represented by Pk, Qk, respectively. Coefficient parameters of the power state estimating model are represented by a, b. The power state estimating model can be updated simply by transmitting the coefficient parameters a, b to the power system control device 2 from the power system control central apparatus 1 when a base calculation expression is previously stored in the power system control device 2.

[Mathematical formula 1]

$$S_k = \sum_k a_{\eta k} P_k + \sum_k b_{\eta k} Q_k \quad (1)$$

A controlled variable calculating model will be described. The power state of each node estimated by the power state estimating unit 13 is input, to the controlled variable calculating model. Output of the controlled variable calculating model is the controlled variable of each power system control device 2 calculated in the controlled variable calculating unit 14.

As a linear model represented by an expression 2 below, each coefficient parameter is identified by the least square method using input and output data regarding a plurality of time stamps. In the expression 2, a controlled variable Cj is, for example, an output (a tap ratio LRT/SVR (transformer ratio), or reactive power of SVC, a switched capacitor, and a power conditioning system (PCS) with a battery) at a node, j of the power system control device. A load ratio transformer is represented by LRT. An estimated effective power (the real number component of Sm) and an estimated reactive power (the imaginary number component of Sm) at a monitoring node m are represented by Pm, Qm, Vm. Coefficient parameters of the controlled variable calculating model are represented by c, d. Actual measurement values (the power state value of the sensor data) measured by the sensors 3 may be used, if any, as Pm, Qm, Vm.

[Mathematical formula 2]

$$C_j = \sum_m c_{jm} P_m + \sum_m d_{jm} Q_m \quad (2)$$

As described above, the controlled variable to be output from each power system control device 2 can be calculated easily by using the power state estimating model, the controlled variable calculating model, and the sensor data (Pk, Qk), which are described above.

Even when the communication state of the communication network 4 is not in the normal state, proper control can be performed by using the sensor data at a self-terminal so long as each power system control device 2 includes the power state estimating model and the controlled variable calculating model.

The model data 16 will be described. The model data 16 includes parameters a, b that constitute the power state estimating model as illustrated in the expression 1, and parameters c, d that constitute the controlled variable calculating model as illustrated in the expression 2.

A target node (the sensor node k and the monitoring node m) has to be preset. If all nodes with the sensors 3 installed thereon are set as sensor node k, it is expected that estimation accuracy of the power state can be improved. Similarly, if all nodes are set as monitoring node m, it is expected that accuracy of the controlled variable can be improved.

If, however, the health of the communication state of the communication network 4 is not always expected, the sensor data may not be acquired from all sensors 3. Therefore, it may also be possible to use only the sensor data of some of the sensors 3 to perform estimation calculation.

For example, only the self-terminal node j may be used instead of all nodes among the nodes j of the power system control device 2 as sensor node. That is, each power system control device 2 may not refer to the sensor data of the sensors 3 other than the sensor of the self-terminal node. The sensor of the self-terminal node represents a sensor that is directly correlated to the power system control device 2, i.e., a sensor that is provided at a node commonly provided with the node of the power system control device 2.

In the case of FIG. 2, the power system control device 2a includes the self-terminal node 31a and the self-terminal sensor 3a. Similarly, the power system control device 2b includes the self-terminal node 31d and the self-terminal sensor 3c. Similarly, the power system control device 2c includes the self-terminal node 31g and the self-terminal sensor 3e.

By restricting the sensor data to be referred by the power system control device 2 to only the sensor data of the self-terminal sensors 3, the power system control device 2 can estimate the power state of the power system by using the power state estimating model even when the health of the communication state is lost.

Regarding the monitoring node m, there is no particular reason to decrease the number of target nodes. This is because the controlled variable can be calculated by using the controlled variable calculating model so long as the power state has been estimated.

FIGS. 7(a) and 7(b) are schematic diagrams illustrating examples of a power state estimating model and a controlled variable calculating model, respectively, as linear models. The power state estimating model is indicated by a bold line in FIG. 7(a) where the horizontal axis represents the input of sensor data (the power state value measured by the sensor 3) and, the vertical axis represents the estimated value of the power state.

Figure 7:
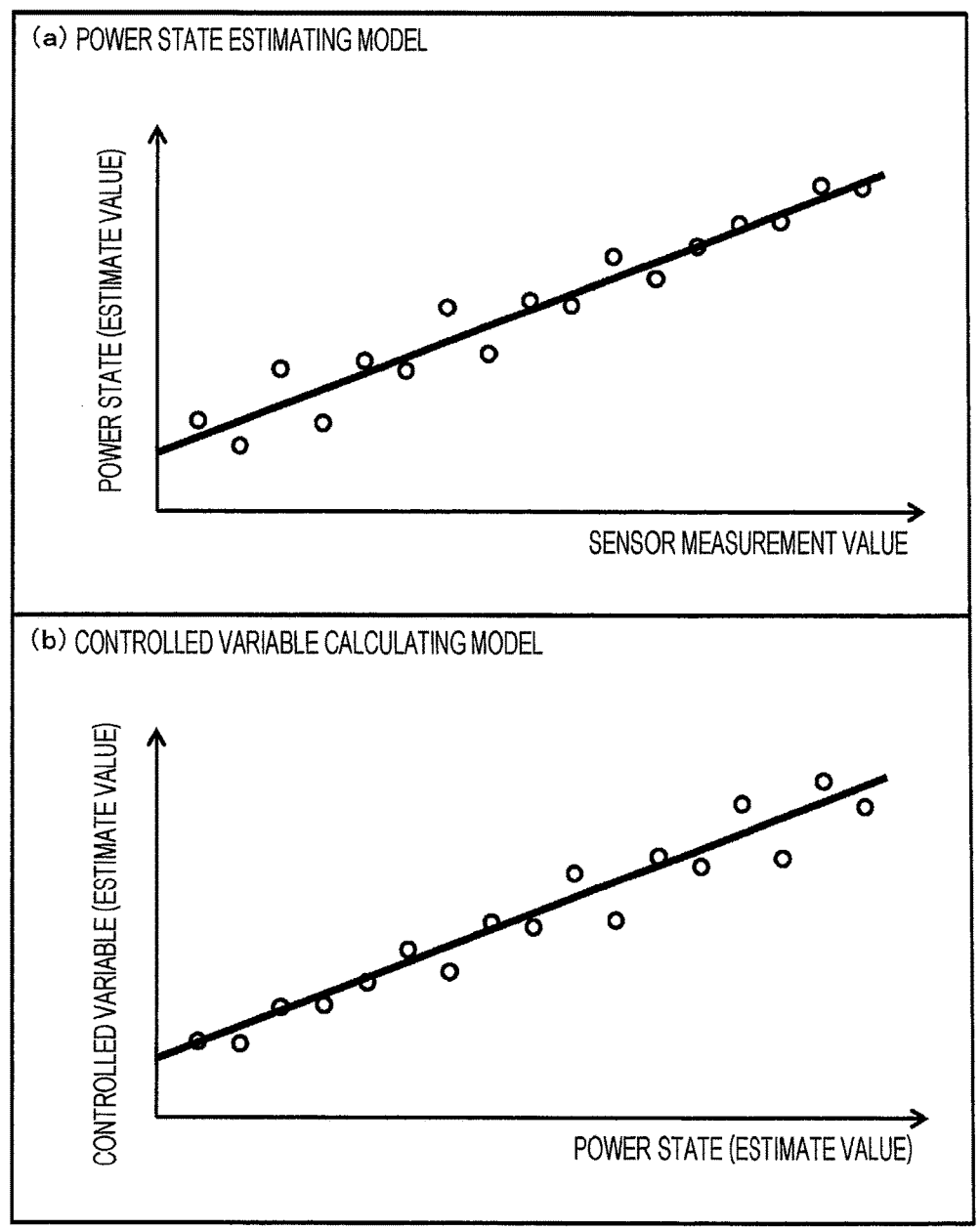
FIGS. 7(a) and 7(b) are schematic diagrams illustrating examples of a power state estimating model and a controlled variable calculating model, respectively.

The controlled variable calculating model is indicated by a bold line in FIG. 7 (b) where the horizontal axis represents the estimated value of the controlled variable and the vertical axis represents the estimated controlled variable.

Figure 8:
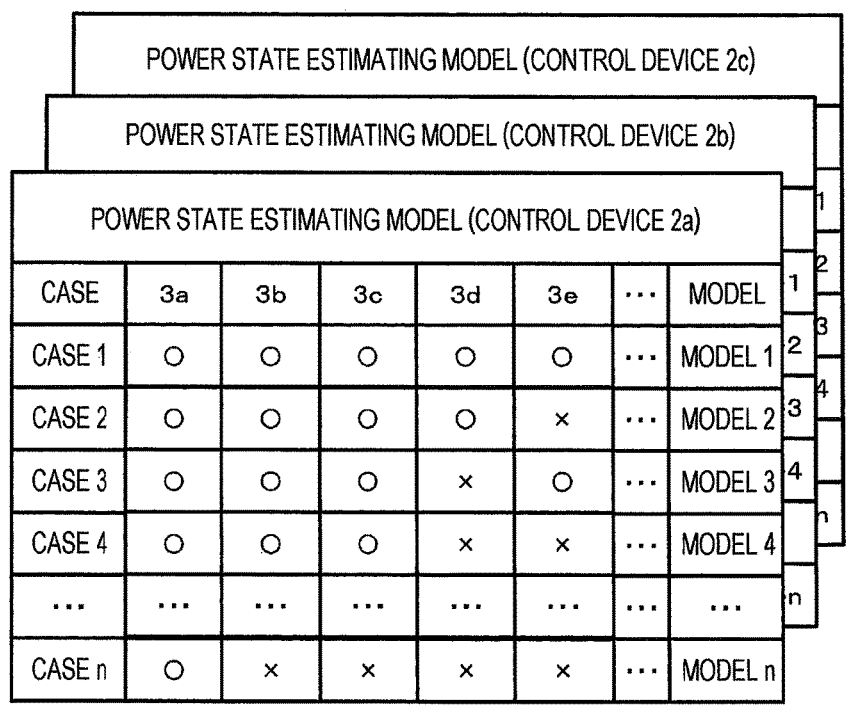
FIG. 8 is an explanatory diagram illustrating creation of the power state estimating model for each combination of the obtained measurement data.

FIG. 8 is an explanatory diagram illustrating creation of the power state estimating model for each combination of the obtainable sensor data. The power state estimating unit 13 of the power system control central apparatus 1 creates the power state estimating model corresponding to the obtaining state of the sensor data from the sensors 3a to 3e.

In case 1, for example, the sensor data can be normally obtained from all sensors 3a to 3e. The power state estimating model is created using the sensor data from all sensors 3a to 3e in the case 1. In case 2, the sensor data can be obtained only from the sensors 3a to 3d, excluding the sensor 3e, of the sensors 3a to 3e, such that the sensor data only from the sensor 3e cannot be obtained. The power state estimating model is created according to the obtained sensor data alone (sensor data from the sensors 3a to 3d) in the case 2. In case 3, the sensor data can be obtained only from the sensors 3a to 3c and 3e, excluding the sensor 3d, of the sensors 3a to 3e, such that the sensor data only from the sensor 3d cannot be obtained. The power state estimating model is created according to the obtained sensor data of only the sensors 3a to 3c, and 3e in the case 3.

Similarly, the power state estimating model is created for each combination of the sensor data that can be obtained normally. The power state estimating model can be obtained even in a case where only a single sensor data is obtained (case n). The power state estimating model can be created for the power system control device 2 so long as the sensor data can be obtained from the sensor of the self-terminal node of the power system control device 2. When the power system control device 2 can obtain the sensor data from the sensor of a node remote from the self-terminal node, the power state estimating model is created according to the sensor data of only the sensor of the remote node.

Thus, the power state estimating model is prepared for each power system control device and for each combination of the sensor data. It is possible, therefore, for the power state estimating unit 13 to estimate the power state by using the power state estimating model corresponding to the combination of the obtained sensor data, even when part of the sensor data cannot be obtained due to deterioration of the communication state, failure of sensors, etc.

Figure 9:
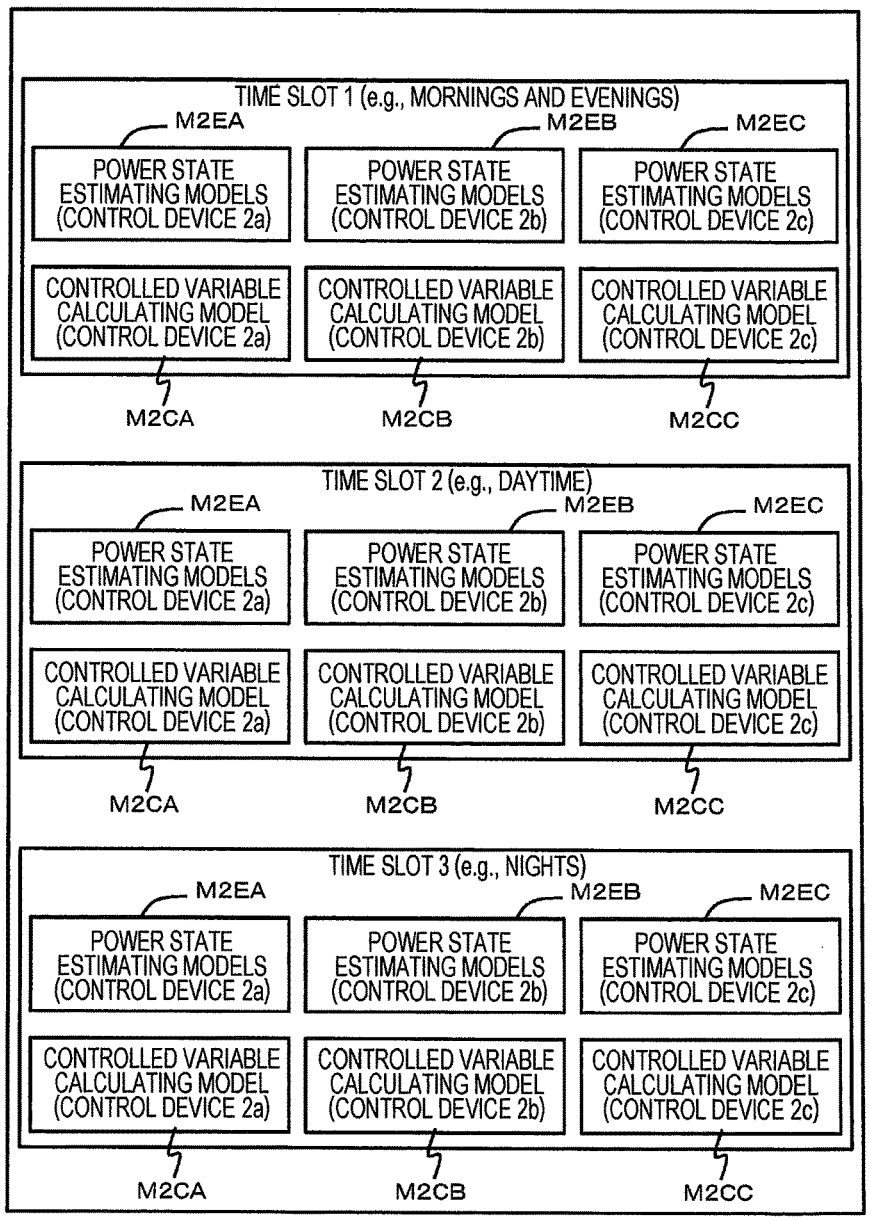
FIG. 9 is an explanatory diagram illustrating creation of the power state estimating model for each time slot.

FIG. 9 illustrates how the power state estimating model is created for each time slot. A supply-demand state of power may change, for example, depending on the weather, temperatures, etc., and also change depending on the time slot, such as morning, afternoon, and night. In the case of a private residence, for example, the power demand increases in the mornings and evenings due to preparation of meals. The power demand decreases in the daytime because the possibility of absence of residents is high. On the contrary, the power generation amount of solar power generation is smaller in the mornings and evenings than that in the daytime. The supply-demand state of power varies according to the characteristics of consumers, such as a private residence, a factory, commercial facilities, etc., and also widely varies depending on the time slot.

In the present embodiment, therefore, hours of a day are divided into a plurality of time slots, such as time slot 1 (mornings and evenings), time slot 2 (daytime), and time slot 3 (night). The power state estimating model and the controlled variable calculating model are created for each time slot.

As described above, a plurality of power state estimating models are created for the power system control devices corresponding to the number of combinations of the obtained sensor data. Power state estimating models M2EA and a controlled variable calculating model M2CA are created for the power system control device 2a. Power state estimating models M2EB and a controlled variable calculating model M2CB are created for the power system control device 2b. Power state estimating models M2EC and a controlled variable calculating model M2CC are created for the power system control device 2c.

Further, the models M2EA, M2EB, M2EC, M2CA, M2CB, and M2CC are created for each time slot for the power system control devices 2a to 2c. The power state estimating unit 13 of, the power system control central apparatus 1 selects a model that matches the obtained combination of the sensor data among the power state estimating models of the current time slot, and estimates the power state.

Referring to FIG. 1 again, the transmitting unit 17 will be described. The transmitting unit 17 has a function, to transmit any of the following data to the power system control devices 2 via the communication network 4. First transmitting data is the controlled variable that has been calculated by the controlled variable calculating unit 14 to be output from the power system control device 2. A second transmitting data is the model data 16 (parameters that constitute the power state estimating model and the controlled variable calculating model) that has been created by the model creating unit 15. A third transmitting data is the system data 10. These three types of data are transmitted at predetermined timing after being updated, and the transmitting cycle is different for each data depending on the updating cycle thereof.

The power system control device 2 will be described. The power system control device 2 includes the controller 20 and the control unit 21 that executes a predetermined control operation. Examples of the power system control device 2 are devices including an LRT, an SVR, an SVC, a switched capacitor, a PCS with a battery, and the like, which are mainly used for voltage, control of the power system state.

The function of the controller 20 will be described. The receiving unit 200 has a data receiving function of the data transmitted from the transmitting unit 17 of the power system control central apparatus 1. Among the received data, the controlled variable to be realized in the power system control device 2 is transmitted to the control mode determining unit 203. The received model data is stored in a storage device (hard disc drive, flash memory, optical disc, etc.) as the model data 202 used in the controller 20. The received system data is stored in the storage device as the system data 201 used by the controller 20. The receiving unit 200 also has a function to receive the sensor data from all or apart of the predetermined sensors 3, and store the sensor data as the measurement data 205.

The system data 201, the model data 202, and the measurement data 205 are similar to the system data 10, the model data 16, and the measurement data 12, respectively, which have been stored in the power system control central apparatus 1. In some cases, the sensor data only from the sensor (self-terminal node sensor) of the power system control device 2 may be stored as the measurement data 205.

The control mode determining unit 203 has a function to determine, at a predetermined cycle, to operate in one of the centralized control mode, the distributed control mode, and the autonomous control mode, which are previously provided as the control modes.

An exemplary control mode determining method will be described by referring to FIG. 10. For example, if a time difference Td between the current time and the last time stamp of the controlled variable that has been received by the receiving unit 200 from the transmitting unit 17 is at or longer than a first predetermined time period T1 that has been preset (Td≥T1), the power system control device 2 transfers to the distributed control mode. The first predetermined time period T1 is set to at least a fixed control command cycle Tc (T1≥Tc).

The power system control device 2 executes a predetermined control operation in the centralized control mode, so long as the communication health is guaranteed and the controlled variable (first controlled variable) data is sent at fixed time intervals to the power system control device 2 from the power system control central apparatus 1.

In contrast, if the communication health is damaged and the power system control device 2 fails to receive the latest controlled variable data from the power system control central apparatus 1 within the first predetermined time period T1 (Td≥T1), the control mode transfers from the centralized control mode to the distributed control mode as described above.

In the distributed control mode, the power system control device 2 estimates the power state of the power system according to the power state estimating model, which has already been received from the power system control central apparatus 1, and the predetermined data of the sensor (e.g., sensor of the self-terminal node). The power system control device 2 further executes a predetermined control operation (or provides a predetermined control output) by calculating the controlled variable (second controlled variable) according to the estimated power state and the received controlled variable calculating model.

The power system control device 2, therefore, can estimate the power state according to the power state estimating model to execute proper control, even when it is unable to receive the control data calculated in the power system control central apparatus 1. If the time slot is switched, the distributed control mode continues by switching the power state estimating model corresponding to the time slot. The distributed control mode executes control by estimating the power state of the power system, which is different from the autonomous control mode that executes control to simply fix the deviation from the target value, which will be described later.

As described above, the power system control device 2 that operates in the distributed control mode can control the power state relatively accurately. Since the supply-demand state of power changes depending on the season, the same power state estimating model cannot be used continuously for a long time. In addition, there is a possibility that the structure of the power system is modified due to, for example, a new distributed power supply connected to the power system or consumers facilities being discarded. The modification of the structure of the power system affects the estimating accuracy of the power state and changes the proper controlled variable. By continuously using such a power state estimating model that is largely apart from the real power supply-demand state, the estimating accuracy of the power state may decrease, and contribution to the maintenance of stability of the power system is prohibited. Therefore, the power state estimating model of the present embodiment includes a preset valid period T2 that can be used effectively.

When the deteriorated communication state continues for a long time and the passage of time Ts after the start of the distributed control mode is at or longer than the valid period (expiry) T2 of the power state estimating model (Ts≥T2), the power system control device 2 transfers from the distributed control mode to the autonomous control mode. The valid period Ts can be referred to as a second predetermined time and set longer than the first predetermined time period T1 (T2>T1≥Tc). In the autonomous control mode, the power system control device 2 performs control so as to cancel the deviation between the target value and the actual measurement value according to the sensor data of the sensor 3 of the self-terminal node. The autonomous control mode is configured to perform control according to only the power state of the self-terminal node, which is different from the distributed control mode that performs control by estimating the power state of the entire power system.

An example will be given to help understand the transfer timing between the control modes. When the communication health is guaranteed, the power system control central apparatus 1 transmits the controlled variable calculated from the sensor data to the power system control device 2 at a control interval Tc of a few seconds to a few minutes. When the communication state is deteriorated, and the controlled variable cannot be received even after the predetermined time period T1, which is set to about a few minutes, has been waited, the control mode of the power system control device 2 transfers from the centralized control mode to the distributed control mode.

After the transfer to the distributed control mode, when the predetermined time period T2, which ranges from a day to several days, from a week to several weeks, or from a month to several months, has passed, the control mode is shifted from the distributed control mode to the autonomous control mode. The valid period T2 of the power state estimating model may be defined as the passage of time after the creation of the model, or may be defined by date, such as "valid till Jun. 1, 2012". The numerical values specified above are provided as merely an example for ease of understanding, and the embodiment of the present invention is not limited to these values.

When the communication health is recovered under control of the distributed control mode, and the power system control device 2 receives the controlled variable from the power system control central apparatus 1, the control mode is shifted from the distributed control mode to the centralized control mode. The control mode may be shifted to the centralized control mode immediately when the controlled variable is received. Alternatively, the distributed control mode may be continued until a new controlled variable is received. When the new controlled variable is received, the time difference Td between the time when the new controlled variable is received and the time when the last controlled variable is received is below the first predetermined time period T1, the control mode may be shifted from the distributed control mode to the centralized control mode.

Similarly, in the autonomous control mode, the control mode may be shifted to the centralized control mode immediately when the controlled variable is received from the power system control central apparatus 1. Alternatively, it may also be possible to wait until a new controlled variable is received. When the time difference between the time when the new controlled variable is received and the time when the last controlled variable is received is below the first predetermined time period T1, the control mode may be shifted from the autonomous control mode to the centralized control mode.

The structure of other parts of the power, system control device 2 will be described. According to the control mode determined in the control mode determining unit 203, the controlled variable calculation determining unit 204 has a function to calculate or determine the controlled variable output from the own device 2 (power system control device).

When the centralized control mode is selected as the control mode, the controlled variable calculation determining unit 204 determines the use of the controlled variable data as is received from the power system control central apparatus 1. In the case of the distributed control mode, the controlled variable calculation determining unit 204 executes calculations represented by the above expressions 1, 2 according to the power state estimating model and the controlled variable calculating model, both defined by the model data 202 received from the power system control central apparatus 1, to determine the controlled variable. In the case of the autonomous control mode, the controlled variable calculation determining unit 204 determines the controlled variable, according to a predetermined fixed method, from the control parameters of the power system control device 2 and the measurement data 205 included in the system data 201.

For example, the controlled variable output from the own device 2 may be calculated and determined by the LRT/SVR according to the LDC system, or by the SVC, the switched capacitor, or the PCS with a battery according to voltage stabilizing control.

The control unit 21 will be described. The control unit 21 has a function to perform control output as a "predetermined control operation" according to the controlled variable determined in the controlled variable calculation determining unit 204. When the control unit 21 is formed by the LRT/SVR, its control output is represented by a tap ratio (transformation ratio). The control unit 21 switches the tap to a corresponding tap number by referring to a tap map (list that includes tap numbers corresponding to the transformation ratio) included in control parameters. When the corresponding tap number is already set, the switching operation is not performed.

When the control unit 21 is formed by the SVC, the switched capacitor, or the PCS with a battery, its control output is represented by either a reactive power output or a target voltage. When, the control output represents the reactive power output, "lead 50 kvar" or "lag 30 kvar", for example, may be output.

When the control unit 21 is formed by the SVC, the switched capacitor, the PCS with a battery, or the like, the output operation is performed accordingly. When the control output represents the target voltage, the control unit 21 first monitors a difference between the target voltage and a voltage at a point where the power system control device 2 is installed. By using the difference, the control unit 21 amends the target voltage by, for example, PI control (proportional control, integral control). The control unit 21 determines the reactive power so as to match the amended target voltage by considering reactance between an inverter (capacitor) and the point where the power system control device 2 is installed. The control unit 21 then performs the output operation according to the reactive power.

Figure 11:
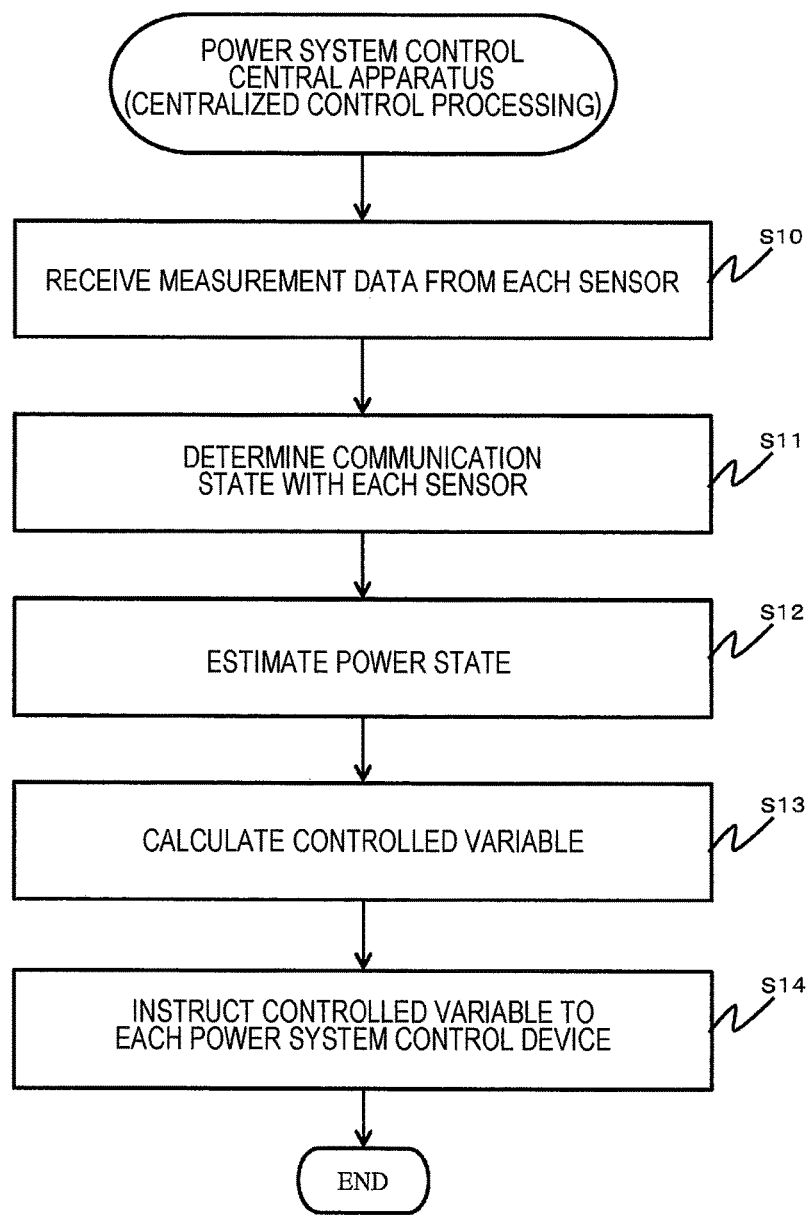
FIG. 11 is a flowchart of centralized control processing executed by a power system control central apparatus.
Figure 12:
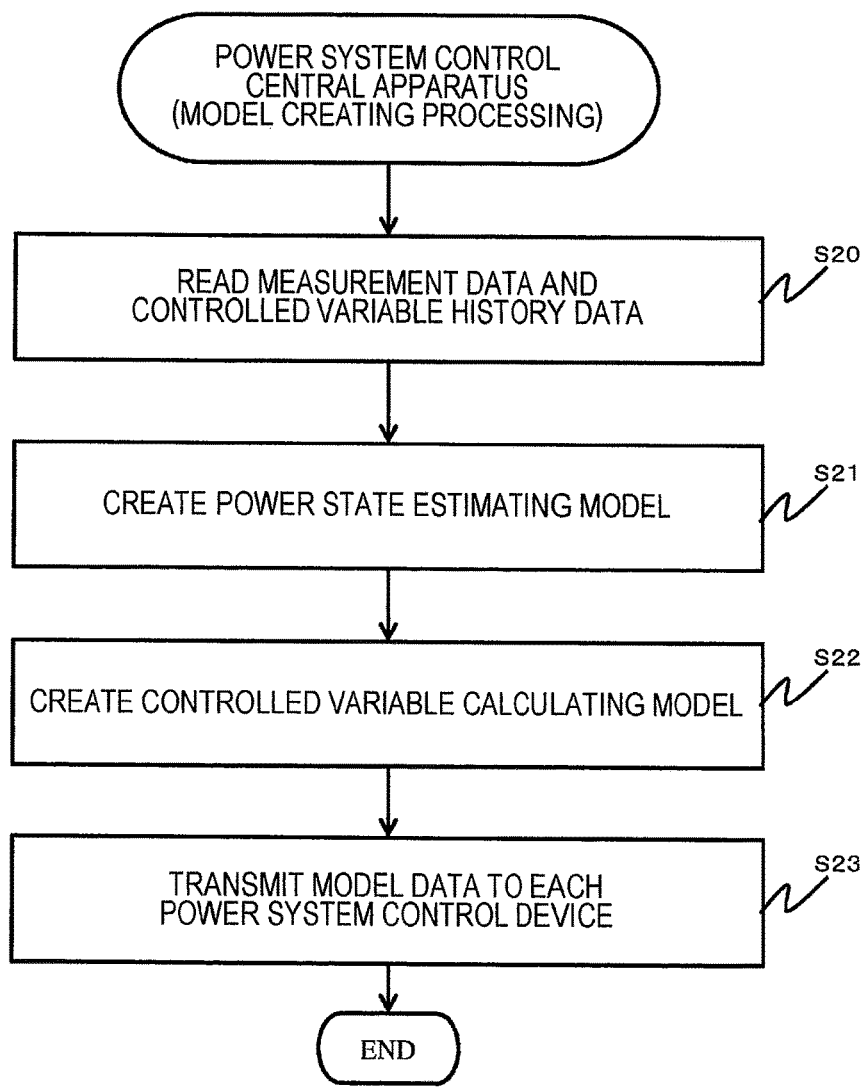
FIG. 12 is a flowchart of model creating processing to be transmitted to the power system control device executed by the power system control central apparatus.
Figure 13:
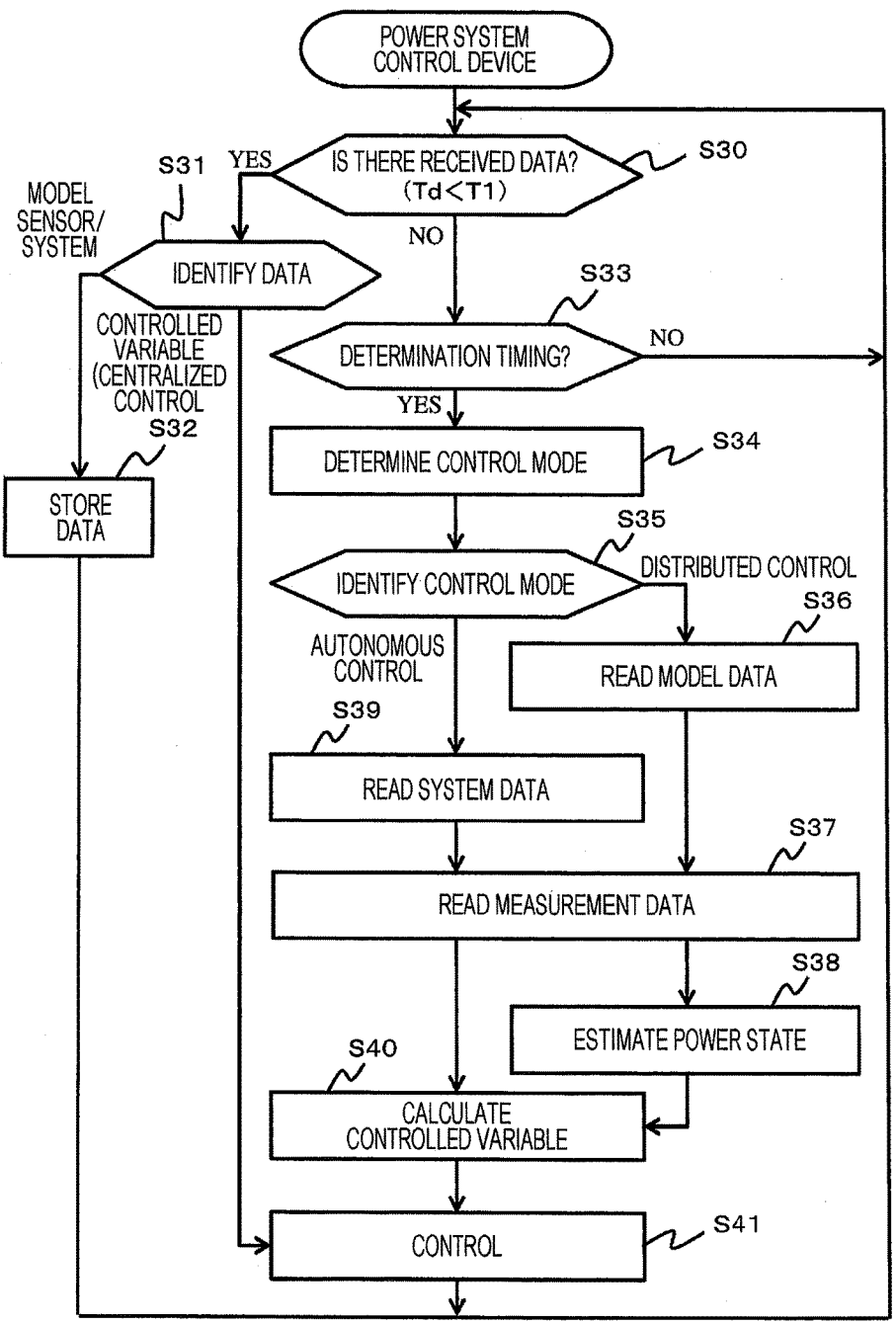
FIG. 13 is a flowchart of control processing executed by the power system control device.

A process flow of the system for controlling the power system will be described by referring to flowcharts illustrated in FIGS. 11 to 13. First, the centralized control performed in the power system control central apparatus 1 will be described by referring to the flowchart of FIG. 11.

The communication state monitoring unit 11 collects sensor data with a time-stamp from each sensor 3 at the predetermined constant monitoring cycle Tm, and stores the obtained sensor data as the measurement data 12 (S10). The communication state monitoring unit 11 determines the health (normal or abnormal state) of the communication state with the power system control central apparatus 1 for each sensor (S11).

The power state estimating unit 13 determines observability in the power state estimation calculation according to the number of sensor data whose communication state has been determined to be normal (hereinafter referred tows normal sensor data number). The power state estimating unit 13 performs, according to the method that differs depending on the observability, estimation calculations of the power state (voltage, effective power, reactive power, etc.) of the entire power system by using the system data 10 and the sensor data of the sensors having been determined to be normal. When the observability is determined, the state estimation calculation including the power flow calculation is performed, otherwise only the power flow calculation is performed. Accordingly, the estimate value of the power state at an optional point of the power system is obtained (S12).

The controlled variable calculating unit 14 calculates the controlled variable to be output from each power system control device 2 by using the estimated power state (S13). Lastly, the transmitting unit 17 transmits the calculated controlled variable as a command value to each power system control device 2 via the communication network 4 (S14).

As described above, the power system control central apparatus 1 has functions to determine the health of the sensor data from each sensor 3, perform the proper state estimation calculation corresponding to the health state, and transmit the optimal control command value to the power system control device 2 according, to the power state estimation calculation.

The calculation models regarding the power state estimation and the controlled variable calculation in the power system control central apparatus 1 will be described by referring to the flowchart of FIG. 12.

Among the data stored as the measurement data 12, the model creating unit 15 reads the power state measured by the sensor 3, the power state at each node and each branch estimated by the power state estimating unit 13, and the controlled variable of each power system control device 2 calculated in the controlled variable calculating unit 14, to use them as the teacher data (S20).

The model creating unit 15 creates a power state estimating model by using the power state actually measured by the sensor 3, and the power state at each node and at each branch estimated by the power state estimating unit 13, (S21). As described above, the model creating unit 15 identifies the coefficient parameters a, b by the least square method according to the expression 1 above, in order to create the power state estimating model as a linear model (S21).

The model creating unit 15 creates a controlled variable calculating model by using the power state at each node and each branch estimated by the power state estimating unit 13, and the controlled variable of each power system control device calculated in the controlled variable calculating unit 14. As described above, the coefficient parameters c, dare determined according to the expression 2 in the case of the linear model (S22).

The data (coefficient parameters) of the calculation models that have been created for each power system control device 2 is packaged in predetermined combinations. For example, the power system control device 2 (node j) may be related to the combination of the node x and the node y for the power state estimating model and the node j for the controlled variable calculating model. Such packaged data of the calculation models are sent to each power system control device 2 via the communication network 4 (S23).

As described above, the power system control central apparatus 1 has functions to create the power state estimating model and the controlled variable calculating model from the measurement data, and transmit the model data (control parameters) to determine the model to each power system control device 2.

When the calculation model is created as a linear model, the power state estimating model is determined by two parameters a, b, and the controlled variable calculating model is also determined by two parameters c, d. Accordingly, the data size of each model can be reduced. Since the data size of individual model data is small, it is possible to restrict an increase of communication load even when a plurality of model data items are periodically transmitted to each power system control device 2. The model data having a small data size can be transmitted normally even when the communication speed of the communication network is slow. Meanwhile, since the calculation models can be used with only a few parameters, it is possible to estimate the power state and obtain the proper controlled variable even in a case where the performance of a central processing unit (CPU) in the power system control device 2 is low. In other words, it is not necessary to provide a high performance central processing unit or the like in the power system control device 2, which leads to reduction of the manufacturing cost.

The control processing of the power system control device 2 will be described by referring to the flowchart of FIG. 13.

First, the presence of received data is confirmed at the receiving unit 200 (S30). If there is unprocessed received data, a difference between the time stamp of the unprocessed received data and the current time is determined. If the difference Td between the time stamp of the unprocessed received data and the current time is shorter than the first predetermined time period T1, the process proceeds to step S31, otherwise the process proceeds to step S33. The process also proceeds to step S33 when there is no unprocessed received data.

When there is relatively new unprocessed received data (Td<T1), the receiving unit 200 determines the type (S31). If the unprocessed received data is the controlled variable, the centralized control mode is determined and the process proceeds to step S40. If the unprocessed received data is not the controlled variable (i.e., in the case of calculation model data, sensor data, or system data), the receiving unit 200 advances the process to step S32. In step S32, the receiving unit 200 stores each data in a predetermined storage device among the storages devices 201, 202, and 205, and the process returns to step S30.

If it is determined that there is no unprocessed received data (S30: NO) in the receiving unit 200, the control mode determining unit 203 determines whether the current time is the timing to determine the control mode (S33).

In the determination of step S33, the control mode determining unit 203 determines whether a difference Tdt between the last timing of the control mode determination and the current time is at or longer than a preset timing determination time period Tt1. If the passage of time Tdt after the last determination time is at or longer than the predetermined timing determination time period Tt1 (Tdt≥Tt1), the answer is determined to be YES and the process proceeds to step S34. Otherwise, the answer is determined to be NO and the process returns to step S30 after a predetermined waiting time Tw has been waited. Alternatively, the process may be returned to step S30 without the passage of time Tw is waited.

In step S34, the control mode determining unit 203 determines the control mode. As mentioned in connection with FIG. 10, when the difference Td between the current time and the time stamp of the last controlled variable data (latest controlled variable data) received by the receiving unit 200 is at or longer than the predetermined time period T1, the control mode determining unit 203 selects the distributed control mode, and the process proceeds to step S36. In contrast, the control mode determining unit 203 selects the autonomous control mode when the control mode has already been shifted to the distributed control mode, and the passage of time Ts after the transition to the distributed control mode is at or longer than the predetermined time period T2, and the process proceeds to step S39.

The controlled variable calculation determining unit 204 determines the type of the determined control mode (S35). When it is determined that the determined control mode is the distributed control mode, the controlled variable calculation determining unit 204 reads the model data 202 (S36). Further, the controlled variable calculation determining unit 204 reads the measurement data 205 (S37), and estimates the power state of the power system according to the power state estimating model and the sensor data (S38). In step S38, the power state can be estimated by using the power estimating model that corresponds to the combination of the normally obtained sensor data and the time slot corresponding to the current time.

The controlled variable calculation determining unit 204 calculates the controlled variable to be realized at the self-terminal node according to the estimated power state and the controlled variable calculating model (S40). The controlled variable calculated in the controlled variable calculation determining unit 204 is transmitted from the controller 20 to the control unit 21 where the control unit 21 executes the predetermined control operation (S41).

In contrast, if it is determined that the determined control mode is the autonomous control mode, the controlled variable calculation determining unit 204 reads the system data 201 (S39) and subsequently reads the measurement data 205 (S37) The controlled variable calculation determining unit 204 calculates the controlled variable according to the control parameter (FIG. 5) included in the system data 201, the control method (e.g., the LDC method for the LRT/SVR, or the voltage stabilizing control for the SVC, the switched capacitor, or the PCS with a battery), and the sensor data of the self-terminal node.

The controlled variable calculated in the autonomous control mode is then transmitted from the controller 20 to the control unit 21. The control unit 21 executes the predetermined control operation according to the calculated controlled variable (S41).

In the structure of the present embodiment, the power system control central apparatus 1 creates the power state estimating model according to the combination of the normally obtained sensor data. Therefore, the controlled variable can be calculated from the estimation of, the power state even when the state of the communication network 4 is bad and the sensor data cannot always be received from all sensors 3. The system for controlling the power system of the present embodiment, therefore, can estimate the power state to suit the communication environment of the area even though the communication environment is bad, and control the power state of the power system properly.

In the present embodiment, the power system control device 2 can select one of the plurality of control modes according to the communication state. Thus, the power system control device 2 can properly operate according to the state of the communication network 4.

In the present embodiment, the health of the communication state of the communication network 4 is determined according to the time stamp of the received data and the current time to select the control mode corresponding to the communication state. The power system control device 2 can select a proper control mode by evaluating the communication state relatively easily and correctly.

In the present embodiment, the sensor data that represents actual measurement values of the sensors 3, a history of estimate values of the power state, and a history of the calculated controlled variable are stored as the measurement data. According to the measurement data, the controlled variable calculating model and the power state estimating model can be created. Thus, the calculation model of relatively high accuracy can be obtained relatively easily.

In the present embodiment, a set of parameters including model data is provided for use in identifying the power state estimating model and the controlled variable calculating model that have been created in the power system control central apparatus 1. Accordingly, the size of the model data can be reduced and the load of the communication network 4 can be restricted even when the model data is distributed to a plurality of power system control devices 2 from the power system control central apparatus 1. The power system control system of the present embodiment can, therefore, control the power system properly even in the environment where the communication speed is slow and the communication quality is unstable.

The power system control device 2 of the present embodiment executes control in the centralized control mode when the health of the communication state is guaranteed. When the communication state is deteriorated, the control is executed in the distributed control mode. Upon expiry of the valid period of the power state estimating model, the control is executed in the autonomous control mode. The power state can be controlled according to the degree of health of the communication state.

In the present embodiment, the valid period of the power state estimating model is set for use in the distributed control mode. The power state estimating model is not used after the valid period is expired and the control is shifted to the autonomous control mode. Therefore, it is possible to restrict execution of the distributed control when it is far apart from the change of the supply-demand state of power and the change of the structure of the power system, and improve reliability of the system.

Embodiment 2

A second embodiment will be described by referring to FIGS. 14 to 16. Since the embodiments including the present embodiment described below correspond to modifications of the first embodiment, mainly the things that differ from the first embodiment will be described. In a case of the present embodiment described below, the power system control devices 2 that can be managed by the power system control central apparatus 1 are mixed with power system control devices 5 that cannot be managed directly by the power system control central apparatus 1.

Figure 14:
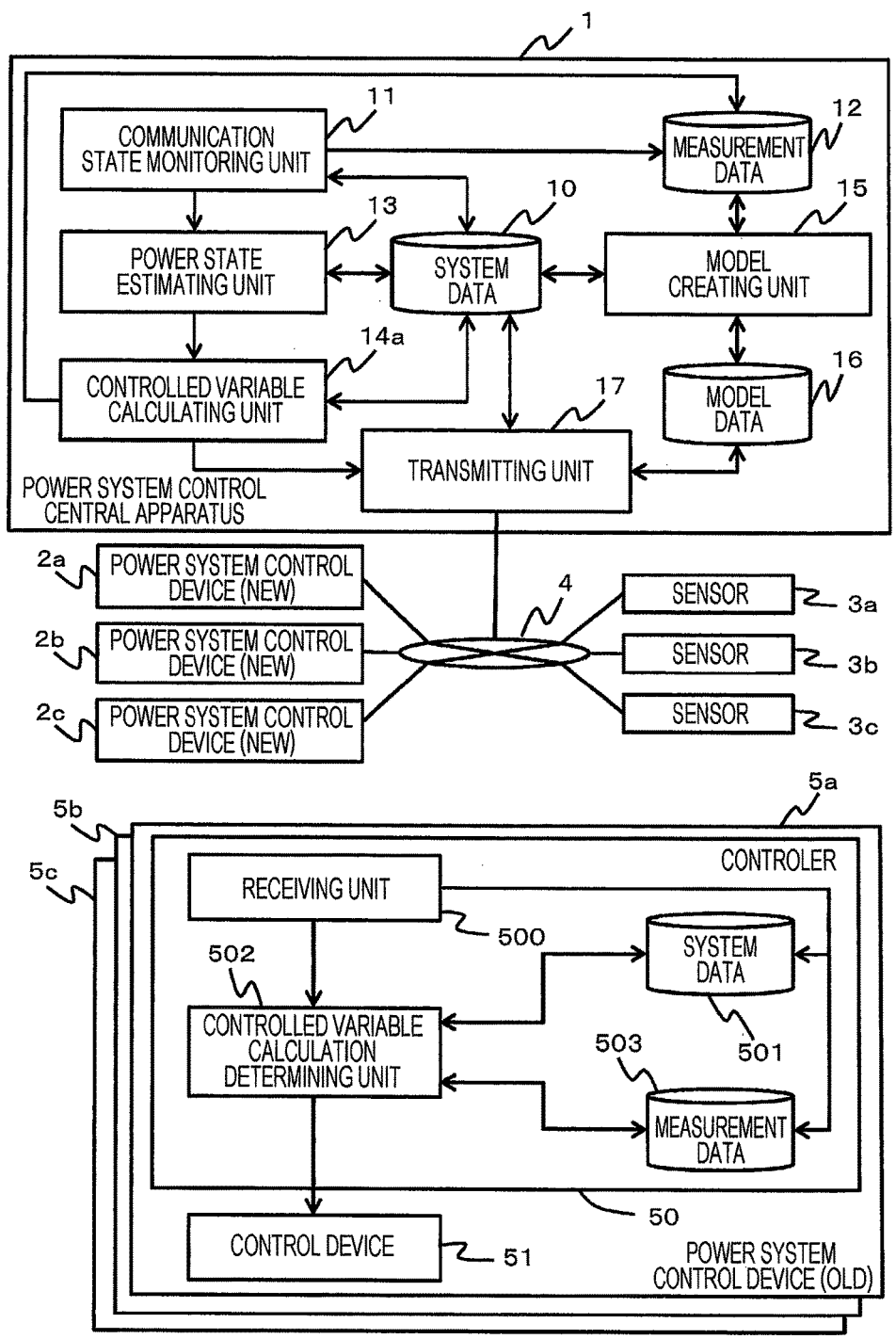
FIG. 14 is an overall structural view of a power system control system according to a second embodiment.
Figure 15:
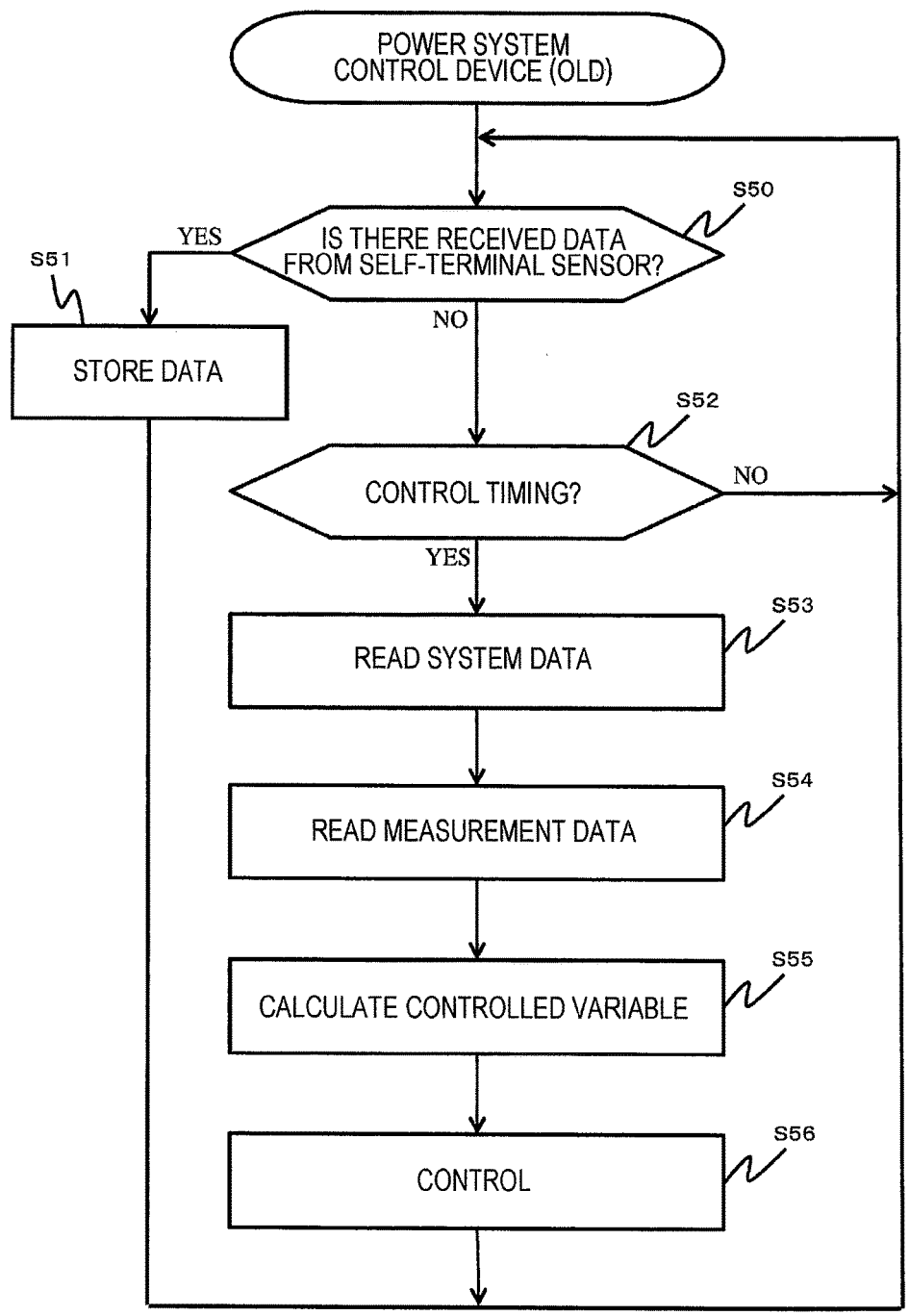
FIG. 15 is a flowchart of autonomous control processing executed by the power system control device.

FIG. 14 is an overall structural view of a power system control system according to the present embodiment. Similar to the system described in the first embodiment, this system includes the power system control central apparatus 1, the plurality of power system control devices 2, and the plurality of sensors 3, which are mutually connected via the communication network 4. In addition, the power system intended by this system includes a plurality of power system control devices 5a to 5c that are not connected to the communication network 4. These control devices 5a to 5c will be referred to as power system control devices 5, unless otherwise specified. For convenience of explanation, the power system control devices 2 mentioned in the first embodiment may be referred to as new power system control devices 2, and the power system control devices that are not connected to the communication network 4 may be referred to as old power system control devices 5 in the following description.

The power system control devices 5 that are dedicated to the autonomous control will be described. Each power system control device 5 includes a controller 50 and a control unit 51. Further, the controller 50 includes a receiving unit 500, a system data storage unit 501, a controlled variable calculation determining unit 502, and a measurement data storage unit 503. In the following, data stored in the system data storage unit 501 may be referred to as system data 501, and data stored in the measurement data storage unit 503 may be referred to as measurement data 503.

The receiving unit 500 implements part of the functions possessed by the receiving unit 200 mentioned above. The receiving unit 500 has a function to receive sensor data from the sensor 3 provided at the self-terminal node, and store the received sensor data as the measurement data 503.

The system data 501 represents control parameters of the own apparatus 5 and is previously stored in the storage device such as a memory. Since the control system varies depending on the type of the power system control device 5, the control parameters thereof are also different depending on the control system. For example, the LDC method is used for the LRT/SVR, and the voltage stabilizing control or the like is used for the SVC, the switched capacitor, and the PCS with a battery. The control parameters corresponding to each method are stored as part of the system data 501.

The controlled variable calculation determining unit 502 has a function to calculate and determine the controlled variable to be output from the own apparatus 5 by entering the measurement data into the control method (control parameters).

The control unit 51 is similar to the control unit 21 of the power system control device 2, and has a function to perform a predetermined control operation according to the controlled variable determined by the controlled variable calculation determining unit 502.

Thus, the power system to be controlled by the power system control system of the present embodiment includes the power system control device 5 dedicated to the autonomous control mode that cannot be controlled directly by the power system control central apparatus 1. Preferably, therefore, the power system control central apparatus 1 calculates the controlled variable or the like by considering the control operation executed by the power system control device 5 dedicated to the autonomous control. Accordingly, a controlled variable calculating unit 14a in the power system control central apparatus 1 of the present embodiment has been modified.

Control processing executed by the power system control device 5 will be described by referring to the flowchart of FIG. 15.

The receiving unit 500 determines whether the data is received from the sensor of the self-terminal node (briefly indicated as self-terminal sensor in FIG. 15) (S50). If there is unprocessed received data, and the difference between the time stamp of the unprocessed received data and the current time is at or shorter than a predetermined time, the receiving unit 500 determines YES and stores the unprocessed received data in the storage unit (S51).

If there is no such unprocessed received data (S50: NO), the controlled variable calculation determining unit 502 determines whether the current time is the predetermined control timing to execute control operations (S52). In step S52, the controlled variable calculation determining unit 502 determines whether the passage of time from the last control mode determination timing is at or longer than the predetermined time. If the passage of time after the last determination timing is at or longer than the predetermined time, the answer is determined to be YES and the process proceeds to step S53. Otherwise, the answer is determined to be NO and the process proceeds to step S53 and then returns to S50 after a predetermined waiting time has passed.

The controlled variable calculation determining unit 502 reads the system data 501 (S53), reads the measurement data 503 (S54), and calculates the controlled variable to be output (S55). The calculation method is similar to that in the case of the autonomous control mode mentioned in the first embodiment. Specifically, the controlled variable is calculated by entering the measurement data 503 to the control parameters (included in the system data 501) and the control method (LDC method for the LRT/SVR, or the voltage stabilizing control for the SVC, the switched capacitor, and the PCS with a battery). The calculated controlled variable is sent to the control unit 51.

In the control unit 51, a predetermined control operation is executed according to the controlled variable calculated in step S55 (S56). As described above, the old power system control devices 5 have a function to execute the controlled variable calculation under the autonomous control mode and perform control output.

Meanwhile, in the power system where the old power system control devices 5 are mixed, although the controlled variable calculating unit 14 of the power system control central apparatus 1 may calculate the controlled variable of the power system control devices 5, it is not possible to transmit the controlled variable to the power system control devices 5. In addition, there is no guarantee that the power system control device 5 calculates the same controlled variable as calculated by the power system control central apparatus 1 and operates according to the controlled variable.

The controlled variable calculating unit 14*a* of the present embodiment, therefore, estimates the controlled variable to be output from the power system control device 5 by using the control method (control parameter) of the power system control device 5 and the power state estimated by the power state estimating unit 13.

In the controlled variable prediction processing, the calculation processing similar to that in the controlled variable calculation determining unit 502 of the power system control device 5 may be executed. The controlled variable calculation determining unit 502 first confirms a predicted controlled variable of each power system control device 5. Subsequently, the controlled variable to be output from each power system control device 2 is calculated in such a manner that the objective function (e.g., a sum of the square deviations between the voltage and the target voltage) is minimized, as mentioned in connection with the controlled variable calculating unit 14 of the first embodiment.

The controlled variable calculation determining unit 502 executes the power state estimation calculation according to the calculated controlled variable of each power system control device 2 and, according to the resulting power state, repeats the prediction of the controlled variable to be output from each power system control device 5. The controlled variable calculation determining unit 502 then re-calculates the controlled variable to be output from each power system control device 2 so as to minimize the objective function.

Thus, the controlled variable calculation determining unit 502 repeats the controlled variable prediction processing of the old power system control device 5 and the optimum controlled variable calculation processing of the new power system control device 2, until the change amount of the controlled variables converge. The controlled variable calculation determining unit 502 adds a time stamp to the finally obtained controlled variable of each power system control device 2 and stores it as the measurement data 12. The finally obtained controlled variable is transmitted to each power system control device 2 from the transmitting unit 17.

Execution of the centralized control mode in the power system control central apparatus 1 in the system where the power system control devices 5 are mixed will be described by using the flowchart of FIG. 16.

Figure 10:
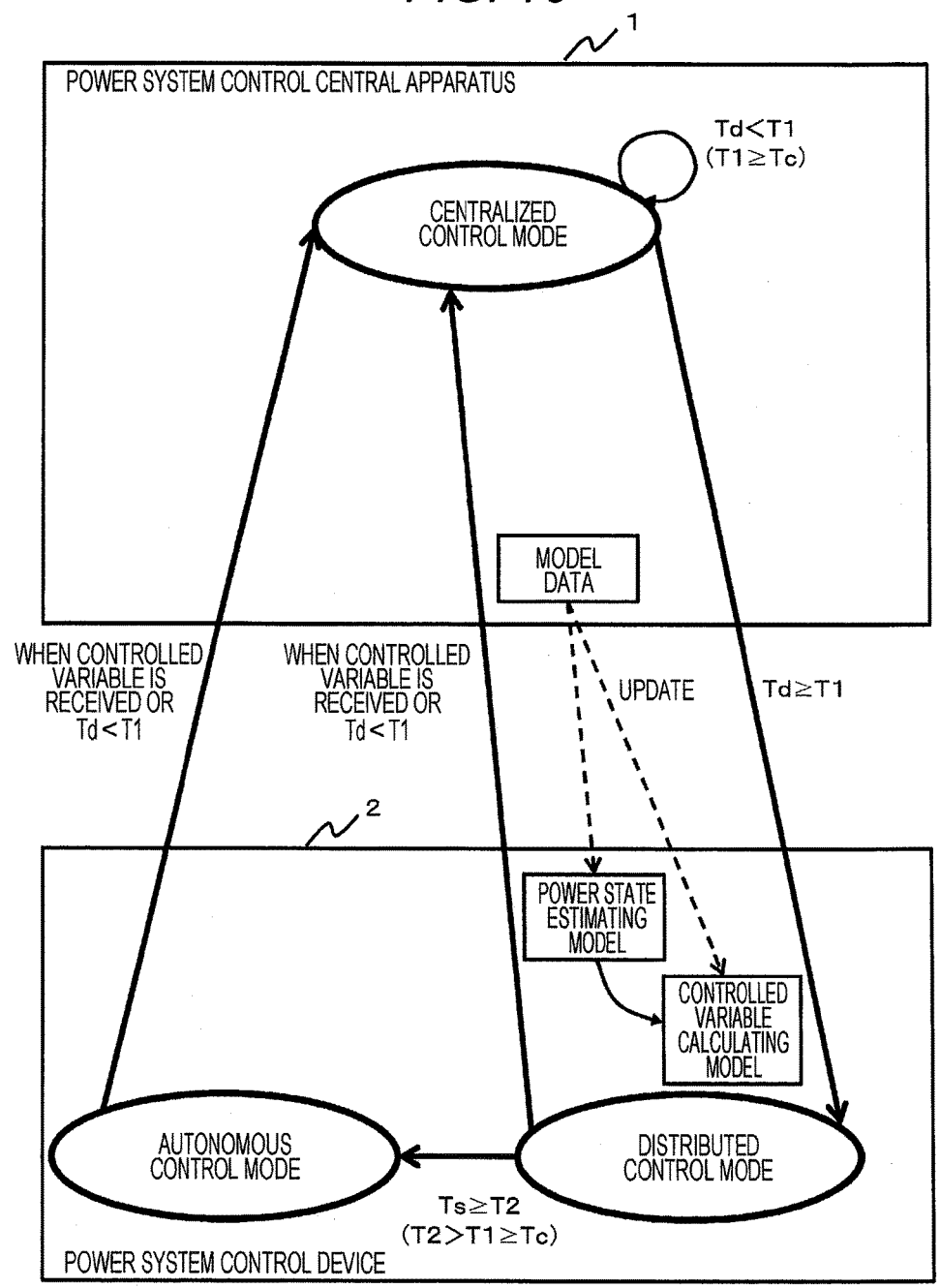
FIG. 10 is an explanatory diagram illustrating transition among a plurality of control modes.
Figure 16:
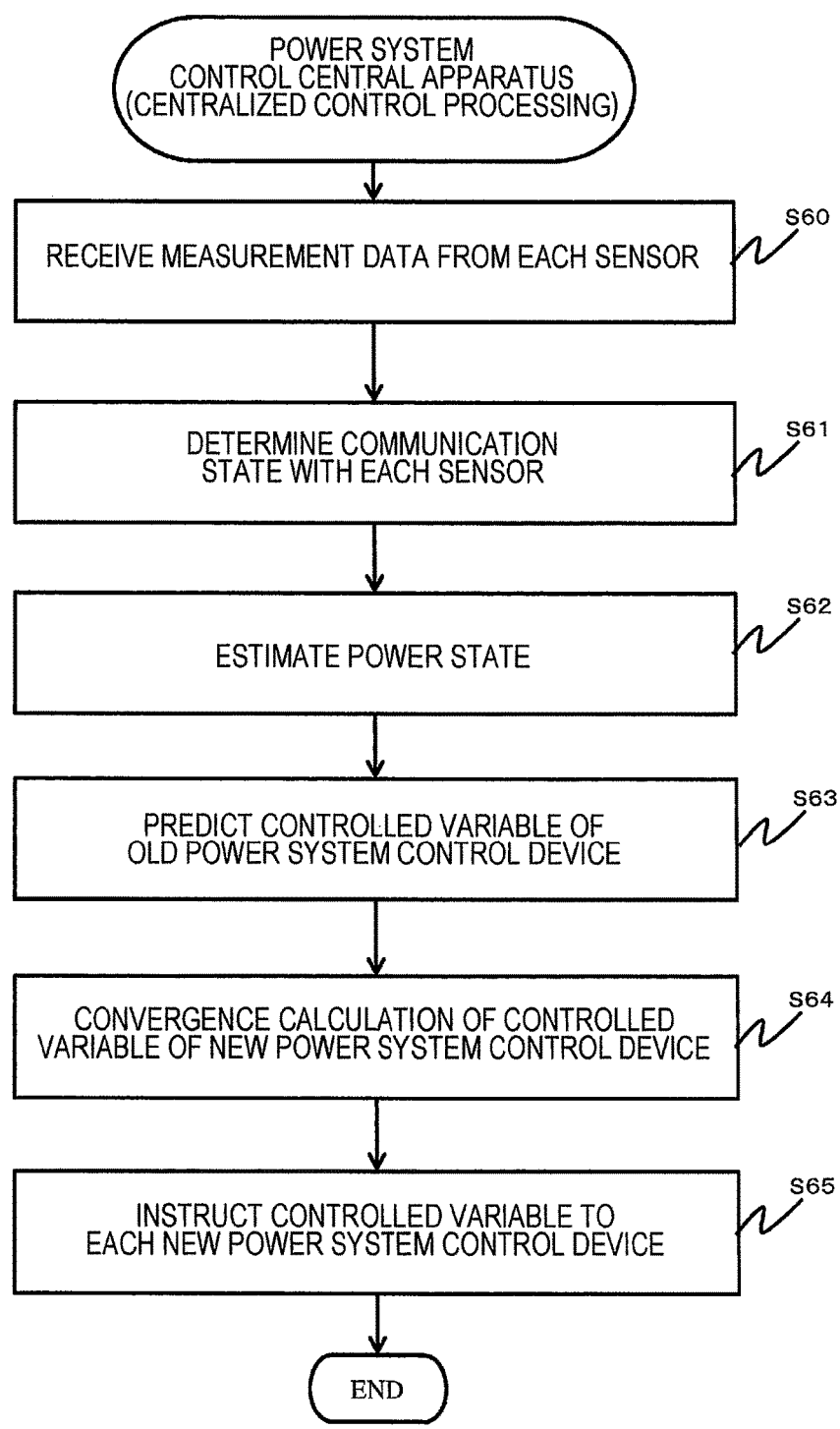
FIG. 16 is a flowchart of the centralized control processing executed by the power system control central apparatus.

The processing in steps S60 to S62 of FIG. 16 are similar to those in steps S10 to S12 of the flowchart of FIG. 10.

Following the power state estimation (S62), the controlled variable calculating unit 14*a* predicts the controlled variable output from each power system control device 5 by using the power state estimate of the power state estimating unit 13 according to the control method (control parameters) of the power system control device 5 (S63).

In step S63, the controlled variable calculating unit 14*a* first confirms a predicted controlled variable of each power system control device 5, followed by calculation of the controlled variable to be output from each power system control device 2 so as to minimize the objective function. According to the calculated controlled variable of each power system control device 2, the controlled variable calculating unit 14*a* re-predicts the controlled variable to be output from each power system control device 5 according to the power state that has been obtained again by performing the power state estimating calculation.

The controlled variable calculating unit 14*a* re-calculates the controlled variable to be output from each power system control device 2 so as to minimize the objective function. The controlled variable calculating unit 14*a* repeats the prediction of the controlled variable of the power system control device 5 and the calculation of the optimal controlled variable of the power system control device 2, until the change amount of the controlled variables converge. Convergence is determined when the difference between previous controlled variable and the current value is at or below a predetermined value (S64).

Lastly, the transmitting unit 17 transmits the calculated optimal controlled variable as the command value to each power system control device 2 via the communication, network 4, as described in step S14 of FIG. 10 (S65).

The present embodiment configured as above has an effect similar to that of the first embodiment. In addition, the power system control central apparatus 1 of the present embodiment allows accurate prediction of the controlled variable of the power system control device 5 when the power system control device 5 is included in the power system. Accordingly, the power system control central apparatus 1 can calculate the optimal controlled variable of the power system control device 2 having the communicating function or the like by considering the prediction result of the controlled variable of the power system control device 5.

Further, in the present embodiment, the calculation model (power state estimating model, controlled variable calculation model) of the power system control device 2 can be created by using the obtained optimal controlled variable of the power system control device 2 as the teacher data. Accordingly, the calculation model used in the power system control device 2 can be properly created even when the power system control device 5 is mixed in the power system.

Third Embodiment

Figure 17:
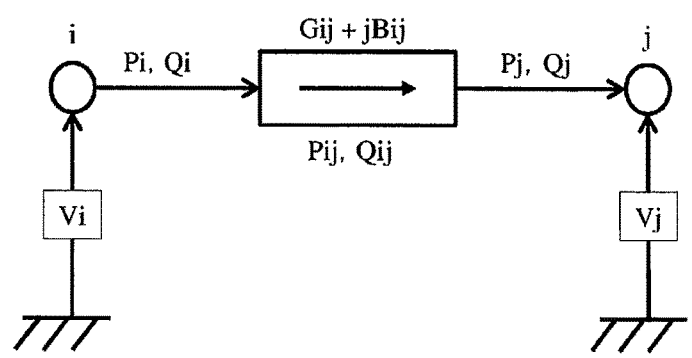
FIG. 17 is an explanatory view of a power state estimating method.

Next, an example of the power state estimating calculation will be described by referring to FIG. 17. The present embodiment is applicable to both the first and second embodiments.

According to an expression 3 below, sensor data Sj(t) at time t is assumed to be true for predetermined evaluation points j (at least one sensor installation point) for a predetermined period in the power system. A sum of deviations between Sj(t) and Eij(t), a calculated power state estimate value, will be calculated as an evaluation value Yi of a combination i.

[Mathematical formula 3]

$$Y_i = \sum_i \sum_j w_j (E_{ij}(t) - S_j(t))^2 \quad (3)$$

where wj represents weight set for individual sensor data. The sensor data Sj and the power state estimate value Eij represent the power state of the same type. The number of types may not be limited to one type, and more than one type of state may be used.

For example, in the case of two types, i.e., voltage and current, the evaluation value Yi is provided as the square sum of deviations of the current and the voltage, respectively. The evaluation values for individual combinations calculated above are compared with each other to extract the combination having the smallest evaluation value.

Another state estimation calculating method using power equations will be described by using a model system illustrated in FIG. 17. In FIG. 17, i and j represent nodes, ij represents a branch that connects between node i and j. G and B represent conductance and susceptance, respectively, at each branch ij.

In the power equation, the node (injected power) is formulated first. With the phase difference is δ (=θi−θj), where θi and θj represent a phase difference at each phase angle of nodes i and j, respectively, effective power Pi and reactive power Qi of node i are given by expressions 4 and 5 below.

[Mathematical formula 4]

$$P_i = \sum_j |V_i||V_j|(G_V \cos\delta + B_V \sin\delta)$$
$$= |V_i|^2 G_{ij} + \sum_{j \neq i} |V_i||V_j|(G_{ij}\cos\delta + B_0 \sin\delta) \quad (4)$$

[Mathematical formula 5]

$$Q_i = \sum_i |V_i||V_j|(G_{ij}\sin\delta - B_{ij}\cos\delta)$$
$$= -|V_i|^2 B_{ij} + \sum_{j \neq i} |V_i||V_j|(G_{ij}\sin\delta - B_{ij}\cos\delta) \quad (5)$$

Next, the branch (line power) ij is formulated. The effective power Pij and the reactive power Qij of branch ij are given by expressions 6 and 7 below.

[Mathematical formula 6]

$$P_{ij} = G_{ij}|V_i|^2 - |V_i||V_j|(Gi_{ij}\cos\delta + B_{ij}\sin\delta) \quad (6)$$

[Mathematical formula 7]

$$Q_{ij} = -B_{ij}|V_i|^2 - |V_i||V_j|(G_{ij}\sin\delta + B_{ij}\cos\delta) \quad (7)$$

Next, the formulation of the state estimation calculation will be described. The state estimation calculation is a question to determine a state variable x that satisfies expression 8 below.

[Mathematical formula 8]

$$z = h(x) + v \quad (8)$$

where z represents an observation value (magnitude of voltage measured by sensors or AMI, power injected into nodes, power state of the branch); h represents a non-linear function (Pij, Qij, Pi, Qi formulated above, and voltage Vi); x represents a state variable (Vi, δij); and v represents noise included in the observation value. The noise v included in the observation value is regarded as white noise.

According to the above, the power state can be estimated.

The present invention is not limited to the embodiments described above. A person skilled in the art would perform various additions and modifications within the scope of the present invention.

The present invention may also be represented as a first control apparatus (power system control, central apparatus 1) for controlling the power state of the power system as mentioned below.

Representation 1.

A first control apparatus used in a system for controlling a power system configured to control a power state of the power system.

The first control apparatus is connected, via communication network, to a plurality of sensor devices that output measurement data at predetermined points of the power system, and a second control apparatus configured to perform a predetermined control operation according to either a first controlled variable calculated in the first control apparatus or a second controlled variable calculated in the second control apparatus.

The first control apparatus
estimates a first power state of the power system by using the measurement data obtained by the plurality of sensor devices,
calculates the first controlled variable according to the estimated first power state, and
transmits the calculated first controlled variable to the second control apparatus.

When it is not able to obtain part of the measurement data, the first control apparatus estimates the first power state by using predetermined measurement data among the obtained measurement data.

Representation 2.

The first control apparatus used in the system for controlling a power system as recited in Representation 1,
previously creates a first power state estimating model for each combination of the predetermined measurement data to estimate the first power state according to the predetermined measurement data,
estimates the first power state by using the predetermined measurement data and the first power state to estimate model that matches the combination of the predetermined measurement data that has been actually obtained among a plurality of the first power state estimating models, calculates the first controlled variable according to the estimated first power state, and transmits the calculated first controlled variable to the second control apparatus.

Representation 3.

The first control apparatus used in the system for controlling a power system as recited in Representation 2, creates a first controlled variable calculating model for calculating the first controlled variable corresponding to the estimated first power state, calculates the first controlled variable according to the estimated first power state and the first controlled variable calculating model, and transmits the calculated first controlled variable to the second control apparatus.

Representation 4.

The first control apparatus used in the system for controlling a power system as recited in Representation 3, wherein the second control apparatus executes a first control mode in a predetermined first case, and executes, in the first control mode, the predetermined control operation according to the first controlled variable received from the first control apparatus.

Representation 5.

The first control apparatus used in the system for controlling power system as recited in any one of Representations 1 to 4.

The first control apparatus transmits, to the second control apparatus, a second power state estimating model created from the first power state estimating model and a second controlled variable calculating model created from the first controlled variable calculating model.

The second control apparatus stores the received second power state estimating model and the received second controlled variable calculating model, executes a second control mode in a predetermined second case, estimates, in the second control mode, a second, power state of the power system according to the measurement data of a predetermined sensor device among the sensor devices and the second power state estimating model, calculates the second controlled variable according to the estimated second power state and the second controlled variable calculating model, and executes the predetermined control operation according to the calculated second controlled variable.

Representation 6.

The first control apparatus used in the system for controlling a power system as recited in Representation 5, wherein the predetermined second case represents a case where it is determined that a communication state with the second control apparatus is decreased below a predetermined value.

Representation 7.

The first control apparatus used in the system for controlling a power system as recited in Representation 6.

The first control apparatus stores the individual measurement data correlated to the first controlled variable, generates a parameter for defining the second power state estimating model and the second controlled variable calculating model by using the stored measurement data and the first controlled variable as teacher data, and transmits the generated parameter to the second control apparatus as the second power state estimating model and the second controlled variable calculating model.

Representation 8.

The first control apparatus used in, the system for controlling a power system as recited in Representation 4, wherein the second control apparatus executes a third control mode in a predetermined third case, calculates, in the third control mode, the second controlled variable according to the measurement data from the sensor device of the second controlled apparatus among the sensor devices, and system data representing the structure of the power system, and executes the predetermined control operation according to the calculated second controlled variable.

Representation 9.

The first control apparatus used in the system for controlling a power system as recited in Representation 8, wherein the predetermined third case represents a case where it is determined that a valid period, which is preset in the second power state estimating mode, is passed.

Representation 10.

The first control apparatus used in the system for controlling a power system as recited in Representation 9, wherein the valid period is set in the second power state estimating model corresponding to timing at which power supply-demand state is changed.

Representation 11.

The first control apparatus used in the system for controlling a power system as recited in Representation 1.

The first control apparatus predicts a controlled variable of another second control apparatus that is not under control of the first control apparatus, calculates the first controlled variable by using the prediction result, re-estimates the first power state by using the calculated first controlled variable, and re-calculates the first controlled variable according to the re-estimated first power state.

Representation 12.

A method for controlling a first control apparatus used in a system for controlling a power system configured to control a power state of the power system.

The power system includes a plurality of sensor devices configured to output measurement data, a first control apparatus that estimates a first power state of the power system by using the measurement data obtained from the plurality of sensor devices, calculates a first controlled variable according to the estimated first power state, and outputs the calculated first controlled variable, and at least a second control apparatus arranged in the power system in a communicable manner with the first control apparatus to execute a predetermined control operation according to either the first controlled variable calculated in the first control apparatus or a second controlled variable calculated in the second control apparatus.

When it is unable to obtain part of the measurement data, the first control apparatus estimates the first power state by using predetermined measurement data among the obtained measurement data.

Representation 13.

A computer program configured to cause a computer to function as a first control apparatus for use in a system for controlling a power system configured to controlling a power state of the power system.

The computer is connected, via a communication network, to a plurality of sensor devices configured to output measurement data at predetermined points of the power system, and a second control apparatus configured to perform a predetermined control operation according to either a first controlled variable calculated in the first control apparatus or a second controlled variable calculated in the second control apparatus.

The computer program implements, on the computer, a function to estimate a first power state of the power system by using the measurement data obtained from the plurality of sensor devices, a function to calculate the first controlled variable according to the estimated first power state, a function to transmit the calculated first controlled variable to the second control apparatus, and a function, when it is unable to obtain part of the measurement data, to estimate the first power state by using the obtained predetermined measurement data.

REFERENCE SIGNS LIST 1 power system control central apparatus
2a to 2c power system control device
3a to 3c sensor
4 communication network
5a to 5c power system control device without communication function
10 system data storage unit
11 communication state monitoring unit
12 measurement data storage unit
13 power state estimating unit
14 controlled variable calculating unit
15 model creating unit
16 model data storage unit
17 transmitting unit
20 controller
21 control device
200 receiving unit
201 system data storage unit
202 model data storage unit
203 control mode determining unit
204 controlled variable calculation determining unit
205 measurement data storage unit

The invention claimed is:

1. A system for controlling a power system configured to control a power state of the power system, comprising:
a plurality of sensor devices arranged in the power system and configured to output measurement data;
a first control apparatus configured to estimate a first power state of the power system by using the measurement data obtained by the plurality of sensor devices, calculate a first controlled variable according to the estimated first power state, and output the calculated first controlled variable; and
at least a second control apparatus arranged in the power system in a communicable manner with the first control apparatus and configured to execute a predetermined control operation according to either the first controlled variable calculated by the first control apparatus or a second controlled variable calculated in the second control apparatus,
wherein the first control apparatus estimates the first power state by using predetermined measurement data among the obtained measurement data when it is unable to obtain part of the measurement data,
wherein the first control apparatus is further configured to:
previously create a first power state estimating model for each combination of the predetermined measurement data to estimate the first power state according to the predetermined measurement data,
estimate the first power state by using the predetermined measurement data and the first power state estimating model that matches the combination of the predetermined measurement data that has been actually obtained among the plurality of first power state estimating models,
create a first controlled variable calculating model to calculate the first controlled variable corresponding to the estimated first power state,
calculate the first controlled variable according to the estimated first power state and the first controlled variable calculating model, and
transmit the calculated first controlled variable to the second control apparatus, and
transmit, to the second control apparatus, a second power state estimating model created from the first power state estimating model and a second controlled variable calculating model created from the first controlled variable calculating model,
wherein the second control apparatus is further configured to:
store the second power state estimating model and the second controlled variable estimating model received from the first control apparatus,
execute a first control mode in a predetermined first case, and
in the first control mode, execute the predetermined control operation according to the first controlled variable received from the first control apparatus,
execute a second control mode in a predetermined second case,
in the second control mode, estimate a second power state of the power system according to the measurement data of a predetermined sensor device among the sensor devices and the second power state estimating model,
calculate the second controlled variable according to the estimated second power state and the second controlled variable calculating model, and
execute the predetermined control operation according to the calculated second controlled variable, and
wherein the predetermined second case represents a case where it is determined that a communication state between the first control apparatus and the second control apparatus is decreased at or lower than a preset predetermined value.

2. The system for controlling a power system according to claim 1,
wherein the first control apparatus is further configured to:

store the measurement data correlated to the first controlled variable,
generate a parameter to define the second power state estimating model and the second controlled variable calculating model by using the stored measurement data and the first controlled variable as teacher data, and
transmit, to the second control apparatus, the generated parameter as the second power state estimating model and the second controlled variable calculating model.

3. The system for controlling a power system according to claim 1,
wherein the second control apparatus is further configured to:
execute a third control mode in a predetermined third case,
in the third control mode, calculate the second controlled variable according to the measurement data from the sensor device of the second control apparatus among the sensor devices and system data representing the structure of the power system, and
execute the predetermined control operation according to the calculated second controlled variable.

4. The system for controlling a power system according to claim 3,
wherein the predetermined third case represents a case where a valid period preset in the second power state estimating model is passed.

5. The system for controlling a power system according to claim 4,
wherein the valid period is set in the second power state estimating model corresponding to timing at which a power supply-demand state is changed.

6. The system for controlling a power system according to claim 1, wherein
a controlled variable of third control apparatus, which is not under control of the first control apparatus, is predicted,
the first controlled variable is calculated by using the prediction result,
the first power state is re-estimated by using the calculated first controlled variable, and
the first controlled variable is re-calculated according to the re-estimated power state.

7. A method for controlling a power state of a power system, wherein
the power system comprises:
a plurality of sensor devices configured to output measurement data;
a first control apparatus; and
at least a second control apparatus arranged in the power system in a communicable manner with the first control apparatus,
the method comprising:
estimating, by the first control apparatus, a first power state of the power system by using the measurement data obtained from the plurality of sensor devices;
calculating, by the first control apparatus, a first controlled variable according to the estimated first power state;
outputting, by the first control apparatus, the calculated first controlled variable;
executing, by the second control apparatus, a predetermined control operation according to either the first controlled variable calculated in the first control apparatus or a second controlled variable calculated in the second control apparatus;
estimating, by the first control apparatus, the first power state by using predetermined measurement data among the obtained measurement data, when it is unable to obtain part of the measurement data,
previously creating, by the first control apparatus, a first power state estimating model for each combination of the predetermined measurement data to estimate the first power state according to the predetermined measurement data;
estimating, by the first control apparatus, the first power state by using the predetermined measurement data and the first power state estimating model that matches the combination of the predetermined measurement data that has been actually obtained among the plurality of first power state estimating models;
calculating, by the first control apparatus, the first controlled variable according to the estimated first power state and the first controlled variable calculating model for calculating the first controlled variable according to the estimated first power state;
transmitting, by the first control apparatus, the calculated first controlled variable to the second control apparatus;
executing, by the second control apparatus, a first control mode when a difference between the latest data receiving time when the data is received from the first control apparatus and the last data receiving time is smaller than a predetermined first time period,
wherein in the first control mode, executing the predetermined control operation according to the first controlled variable received from the first control apparatus.

8. The method for controlling a power system according to claim 7,
wherein the first control apparatus executes steps of:
transmitting to the second control apparatus, a second power state estimating model created from the first power state estimating model and a second controlled variable calculating model created from the first controlled variable calculating model,
wherein the second control apparatus executes steps of:
storing the second power state estimating model and the second controlled variable calculating model received from the first control apparatus;
executing a second control mode when the difference between the latest data receiving time and the last data receiving time is at or longer than the predetermined first time period;
in the second control mode, estimating the second power state of the power system according to the measurement data of the predetermined sensor device among the sensor devices and the second power state estimating model;
calculating the second controlled variable according to the estimated second power state and the second controlled variable calculating model; and
executing the predetermined control operation according to the calculated second controlled variable.

* * * * *